United States Patent
Munk et al.

(10) Patent No.: US 7,509,740 B2
(45) Date of Patent: Mar. 31, 2009

(54) METHOD OF MANUFACTURING A WING

(75) Inventors: Clayton L. Munk, Maple Valley, WA (US); Paul E. Nelson, University Place, WA (US); David E. Strand, Newcastle, WA (US)

(73) Assignee: The Boeing Company, Seattle, WA (US)

( * ) Notice: Subject to any disclaimer, the term of this patent is extended or adjusted under 35 U.S.C. 154(b) by 602 days.

(21) Appl. No.: 10/867,398

(22) Filed: Jun. 14, 2004

(65) Prior Publication Data

US 2005/0116105 A1   Jun. 2, 2005

Related U.S. Application Data

(63) Continuation of application No. 10/001,536, filed on Nov. 13, 2001, now Pat. No. 6,808,143.

(51) Int. Cl.
*B21D 53/92*   (2006.01)
(52) U.S. Cl. .................. 29/897.2; 29/407.09; 29/407.1; 29/464; 29/559
(58) Field of Classification Search ................ 29/524.1, 29/243.54, 525.2, 818, 464, 559, 897.2, 407.09, 29/407.1; 227/51, 58; 269/289 R
See application file for complete search history.

(56) References Cited

U.S. PATENT DOCUMENTS 2,423,957 A * 7/1947 Amtsberg .................... 72/358
3,935,633 A * 2/1976 Bunker ......................... 29/559
4,885,836 A * 12/1989 Bonomi et al. ............. 29/524.1
4,998,943 A * 3/1991 Roberts et al. ............. 29/432.2
5,050,288 A * 9/1991 Woods ....................... 29/407.1
5,560,102 A * 10/1996 Micale et al. .............. 29/897.2
6,092,275 A * 7/2000 Kellner et al. ............ 29/525.06
6,314,630 B1 * 11/2001 Munk et al. .............. 29/407.01

* cited by examiner

Primary Examiner—Jermie E Cozart
(74) Attorney, Agent, or Firm—J. Michael Neary

(57) ABSTRACT

A method and apparatus for manufacturing wings includes a fixture that holds wing panels for drilling and edge trimming by accurate numerically controlled machine tools using original numerical part definition records, utilizing spatial relationships between key features of detail parts or subassemblies as represented by coordination features machined into the parts and subassemblies, thereby making the parts and subassemblies intrinsically determinant of the dimensions and contour of the wing. Spars are attached to the wing panel using the coordination holes to locate the spars accurately on the panel in accordance with the original engineering design, and in-spar ribs are attached to rib posts on the spar using accurately drilled coordination holes in the ends of the rib and in the rib post. The wing contour is determined by the configuration of the spars and ribs rather than by any conventional hard tooling which determines the wing contour in conventional processes.

9 Claims, 16 Drawing Sheets

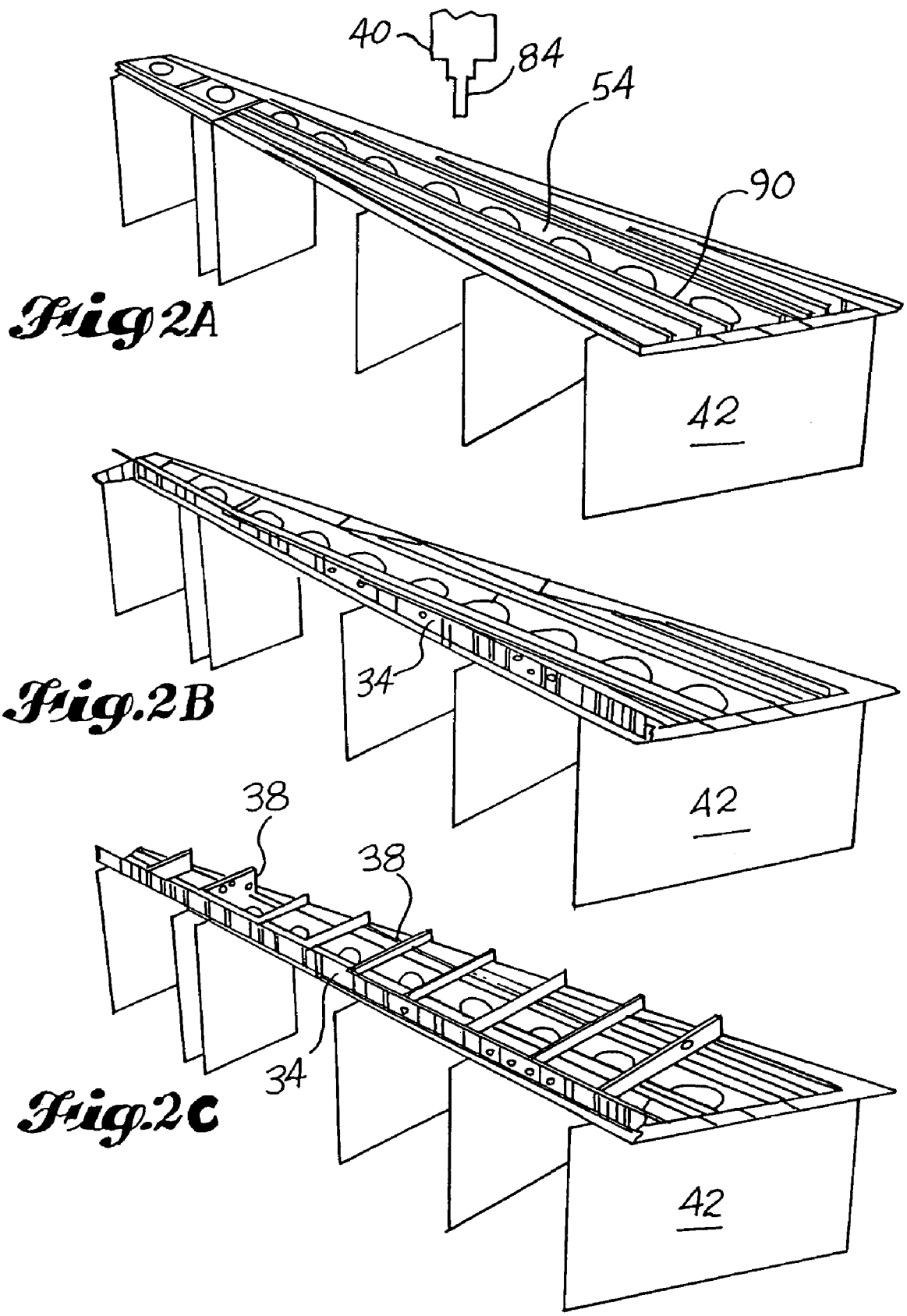

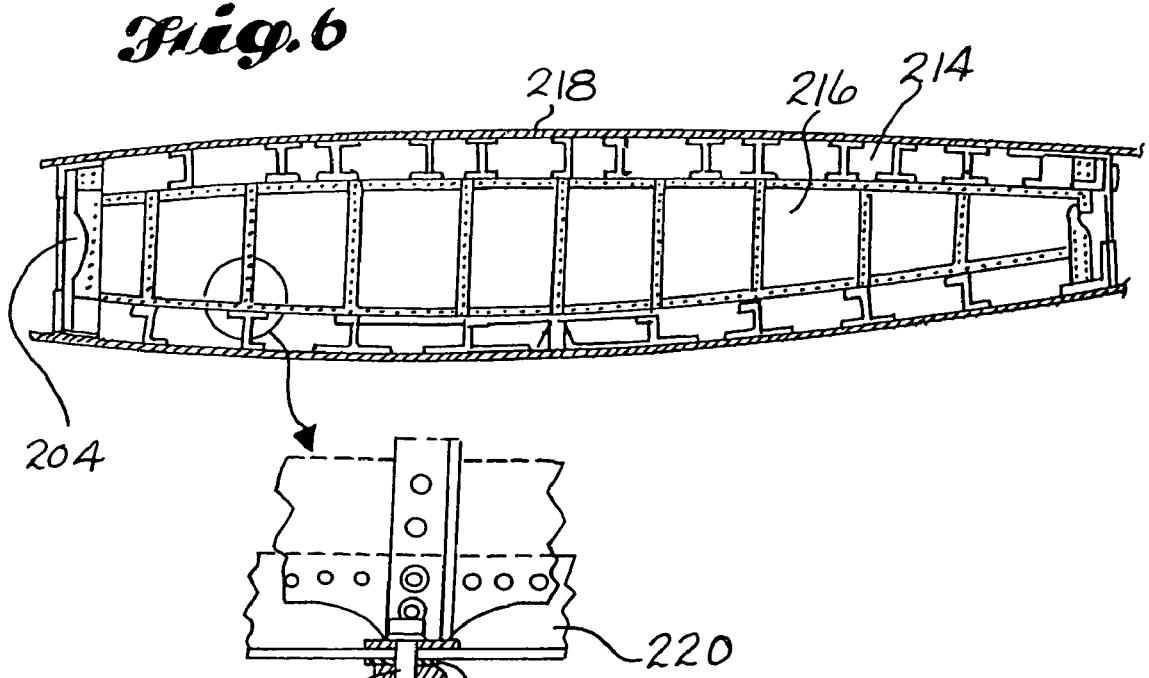
Fig. 6
Fig. 7
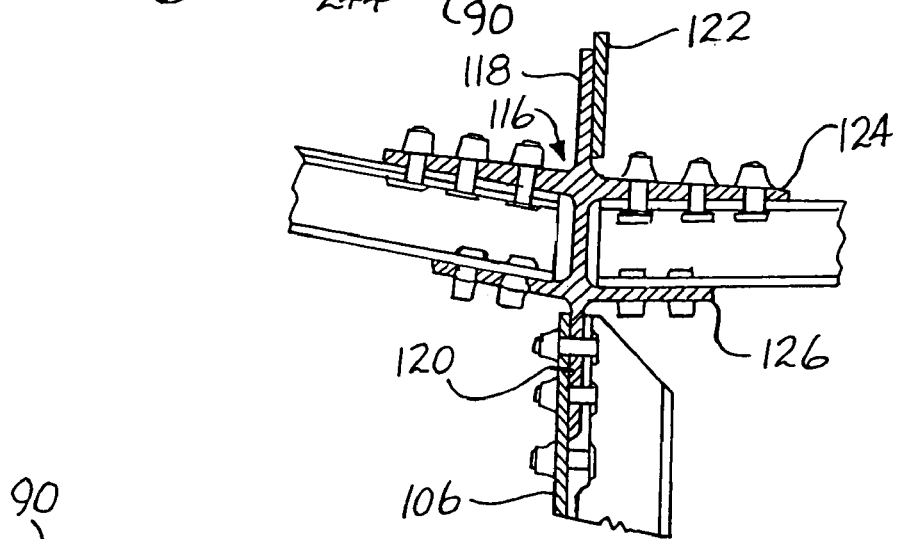
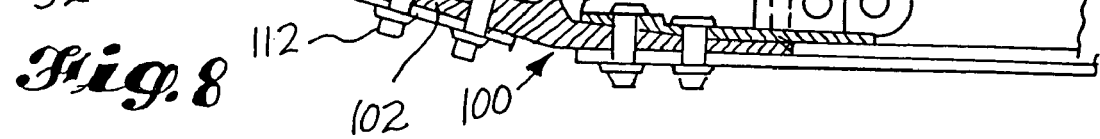
Fig. 8

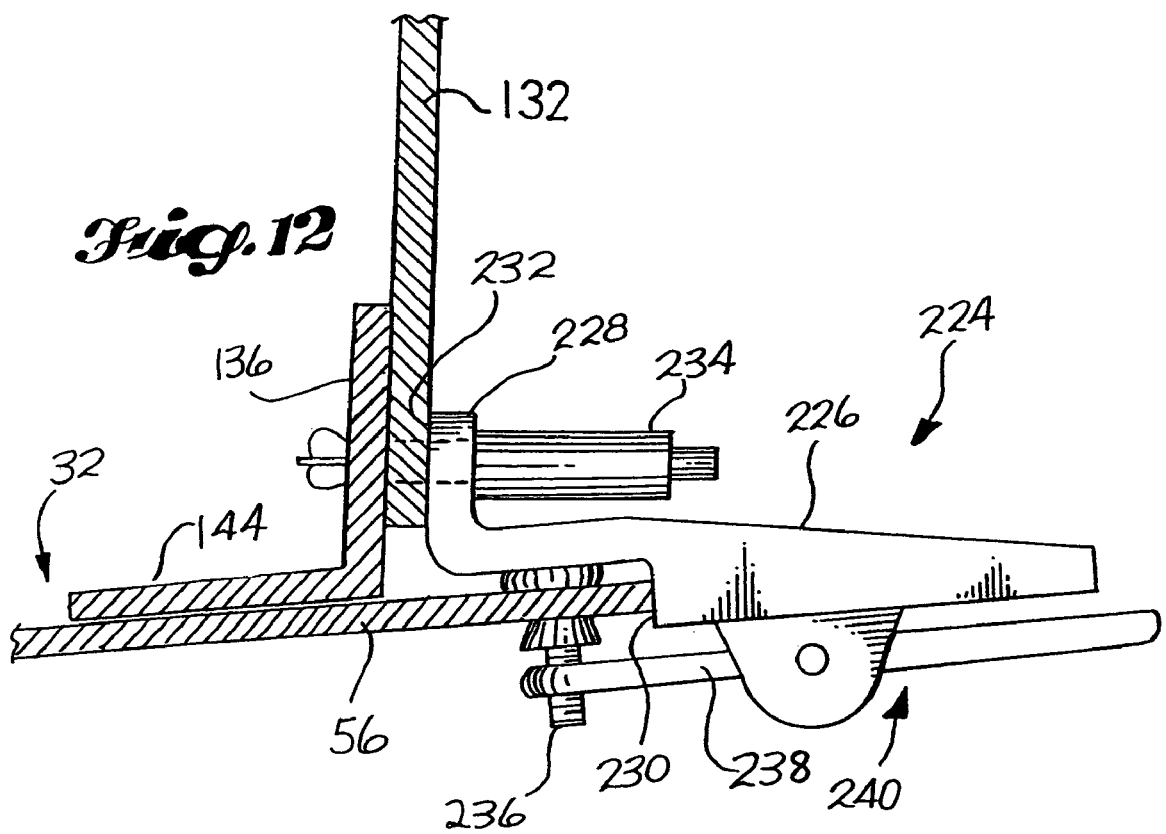
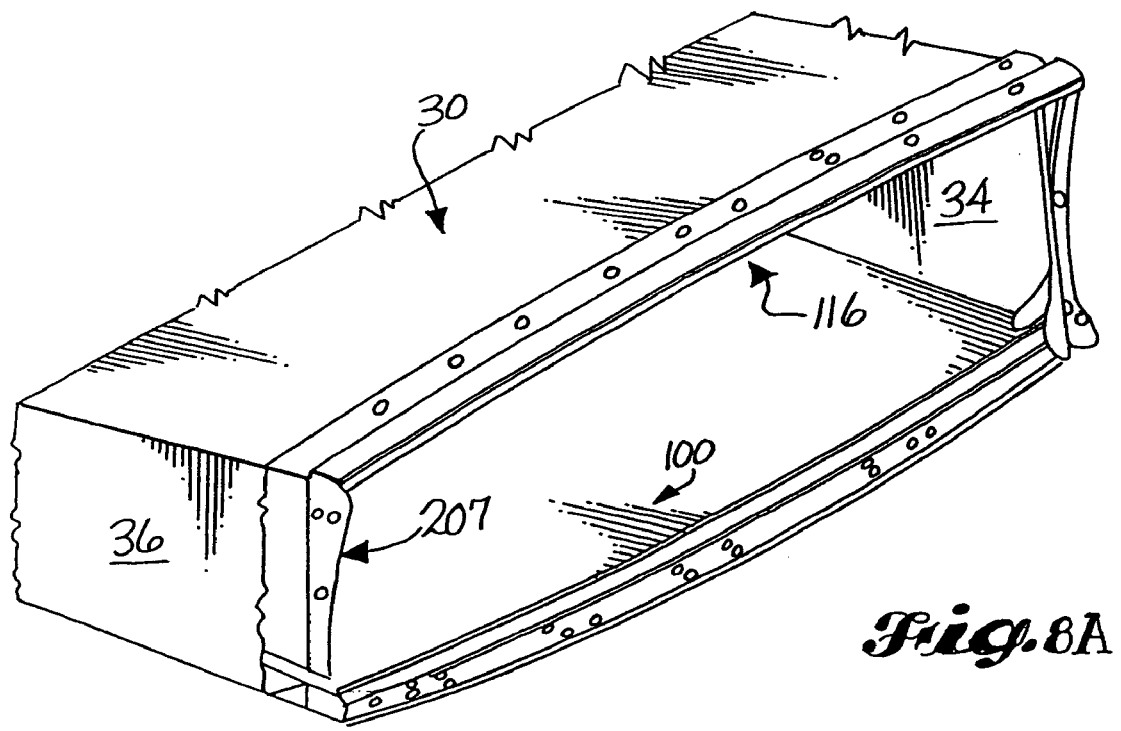

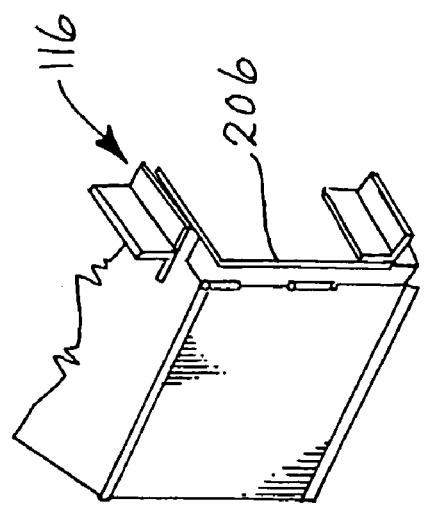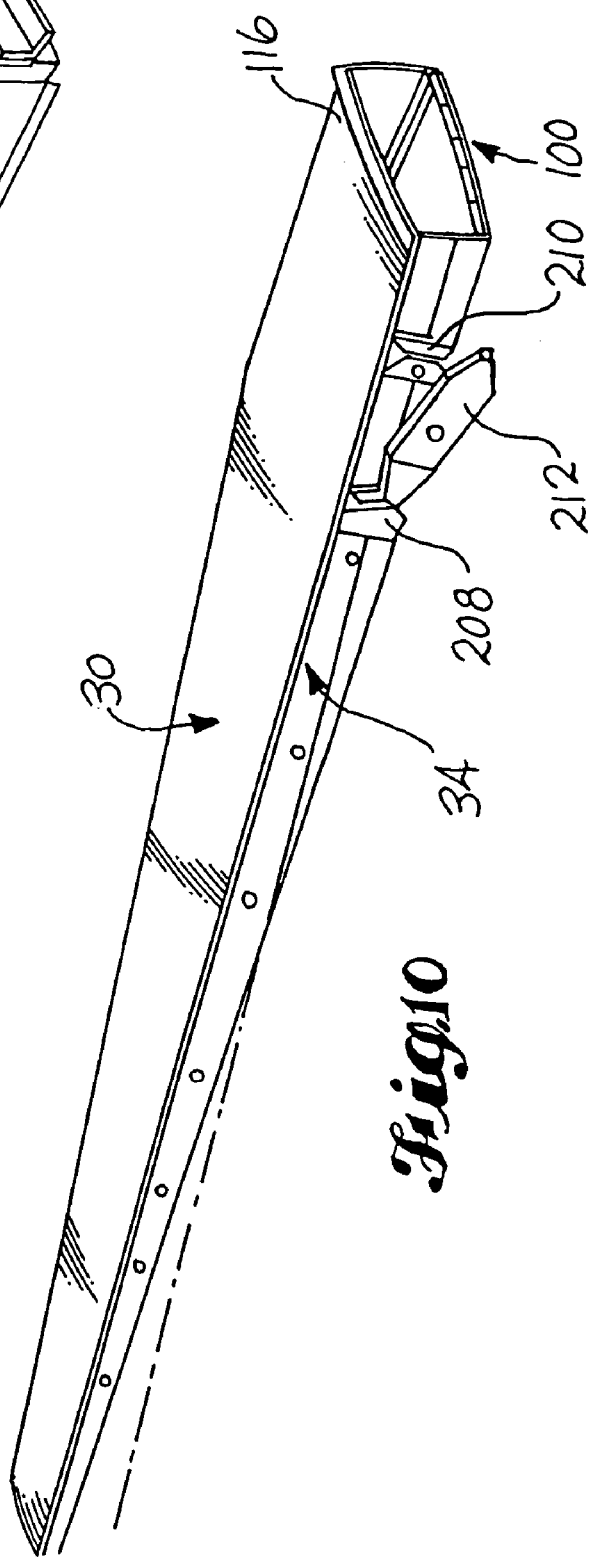

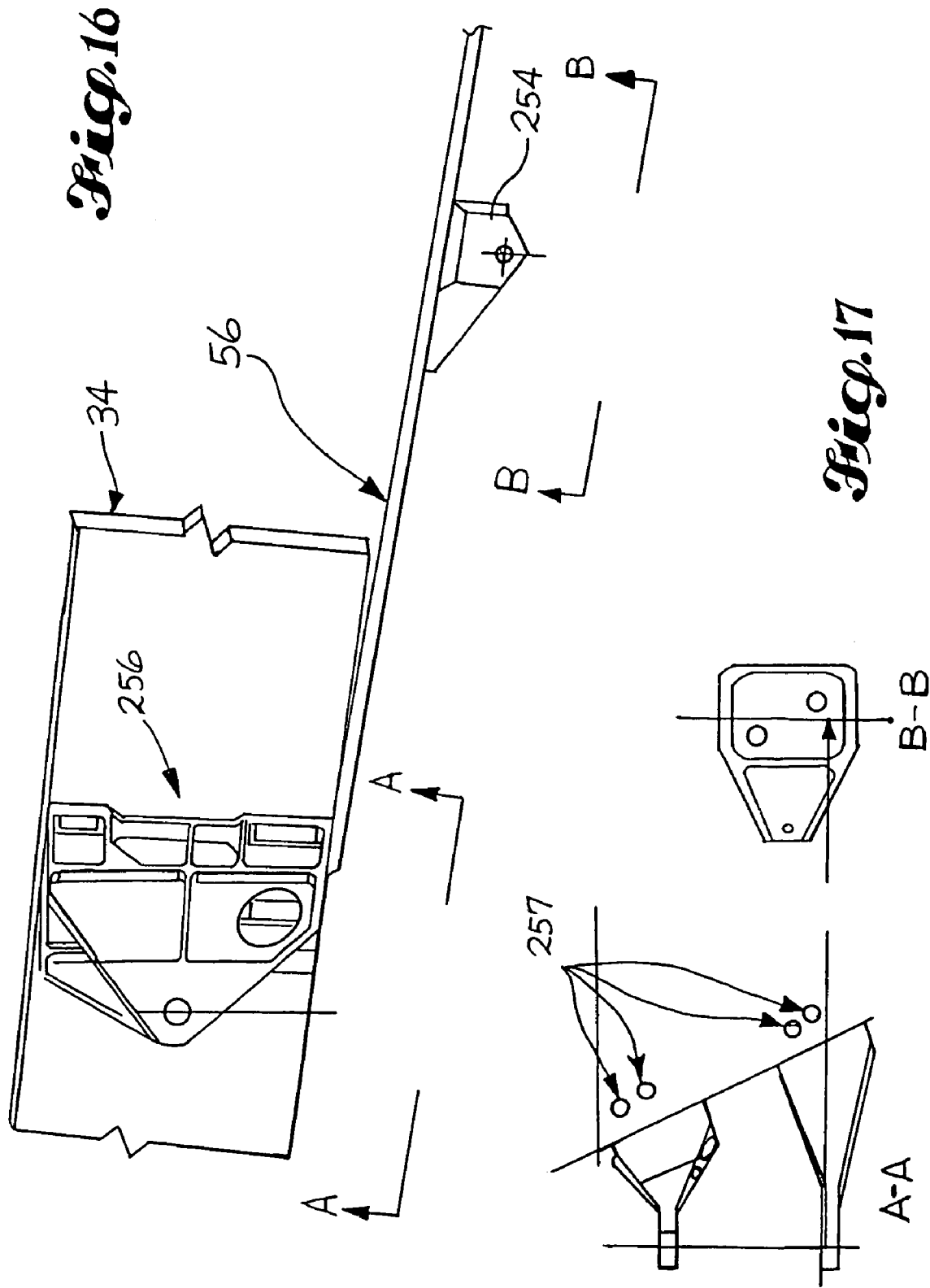

METHOD OF MANUFACTURING A WING

REFERENCE TO RELATED APPLICATIONS

This application relates to a U.S. Provisional Application No. 60/013,986 filed on Mar. 22, 1996, and further to PCT/US97/04550 filed Mar. 21, 1997, and is a continuation of Ser. No. 09/155,251, filed Sep. 21, 1998, now U.S. Pat. No. 6,314,630 issued Nov. 13, 2001 and U.S. Ser. No. 10/'001,536 filed Nov. 13, 2001, now U.S. Pat. No. 6,808,143 all entitled "Determinant Wing Assembly" by David Strand, Clayton Munk and Paul Nelson;

TECHNICAL FIELD

This invention relates to a method and apparatus for inexpensively manufacturing major airplane assemblies to close tolerances, and more particularly, to a method and apparatus for assembling wing skins, spars, ribs and other components with unprecedented precision to produce a wing having close conformance to the original engineering configuration, while significantly reducing tooling expense.

BACKGROUND OF THE INVENTION

Conventional manufacturing techniques for assembling components and subassemblies to produce airplane wings to a specified contour rely on fixtured "hardpoint" tooling techniques utilizing floor assembly jigs and templates to locate and temporarily fasten detailed structural parts together to locate the parts correctly relative to one another. This traditional tooling concept usually requires primary assembly tools for each subassembly produced, and two large wing major assembly tools (left and right) for final assembly of the subassemblies into a completed wing. Assembly tooling is intended to accurately reflect the original engineering design of the product, but there are many steps between the original design of the product and the final manufacture of the tool, so it is not unusual that the tool as finally manufactured produces missized wings or wing components that would be outside of the dimensional tolerances of the original wing or wing component design unless extensive, time consuming and costly hand work is applied to correct the tooling-induced errors. More seriously, a tool that was originally built within tolerance can distort out of tolerance from the hard use it typically receives in the factory. Moreover, dimensional variations caused by temperature changes in the factory can produce a variation in the final part dimensions as produced on the tool, particularly when a large difference in the coefficient of thermal expansion exists between the tooling material and the wing material, as in the usual case where the tooling is made of steel and the wing components are made of aluminum or titanium. Since dimensions in airplane construction are often controlled to within 0.005", temperature induced dimensional variations can be significant.

Hand drilling of the part on the tool can produce holes that are not perfectly round or normal to the part surface when the drill is presented to the part at an angle that is slightly non-perpendicular to the part, and also when the drill is plunged into the part with a motion that is not perfectly linear. Parts can shift out of their intended position when they are fastened in non-round holes, and the nonuniform hole-to-fastener interference in a non-round hole or a hole that is axially skewed from the hole in the mating part lacks the strength and fatigue durability of round holes drilled normal to the part surface. The tolerance buildup on the wing subassemblies can result in significant growth from the original design dimensions, particularly when the part is located on the tool at one end of the part, forcing all of the part variation in one direction instead of centering it over the true intended position.

Wing components are typically fastened together with high interference fasteners and/or fasteners in cold worked holes. Interference fasteners, such as rivets and lock bolts, and cold working of a fastener hole, both create a pattern of stress in the metal around the hole that improves the fatigue life of the assembled joint, but a long line of such stress patterns causes dimensional growth of the assembly, primarily in the longitudinal direction, and also can cause an elongated part to warp, or "banana", along its length. Attempts to restrain the assembly to prevent such distortion are generally fruitless, so the most successful technique to date has been to attempt to predict the extent of the distortion and account for it in the original design of the parts, with the intent that the assembly will distort to a shape that is approximately what is called for in the design. However, such predictions are only approximations because of the naturally occurring variations in the installation of fasteners and the cold working of holes, so there is often a degree of unpredictability in the configuration of the final assembly. A process for nullifying the effects of the distortion in the subassemblies before they are fastened into the final assembly has long been sought and would be of significant value in wing manufacturing, as well as in the manufacture of other parts of the airplane.

Wing major tooling is expensive to build and maintain within tolerance, and requires a long lead time to design and build. The enormous cost and long lead time to build wing major tooling is a profound deterrent to redesigning the wing of an existing model airplane, even when new developments in aerodynamics are made, because the new design would necessitate rebuilding all the wing major tools and some or all of the wing component tooling.

The capability of quickly designing and building custom wings for airline customers having particular requirements not met by existing airplane models would give an airframe manufacturer an enormous competitive advantage. Currently, that capability does not exist because the cost of the dedicated wing major tooling and the factory floor space that such tooling would require make the cost of "designer wings" prohibitively expensive. However, if the same tooling that is used to make the standard wing for a particular model could be quickly and easily converted to building a custom wing meeting the particular requirements of a customer, and then converted back to the standard model or another custom wing design, airplanes could be offered to customers with wings optimized specifically to meet their specific requirements. The only incremental cost of the new wing would be the engineering and possibly some modest machining of headers and other low cost tooling that would be unique to that wing design The disadvantages of manufacturing processes using hard tooling are inherent. Although these disadvantages can be minimized by rigorous quality control techniques, they will always be present to some extent in the manufacture of large mechanical structures using hard tooling. A determinant assembly process has been developed and is in production for airplane fuselage manufacture, replacing hardpoint tooling with self-locating detail parts that determine the configuration of the assembly by their own dimensions and certain coordinating features incorporated into the design of the parts. This new process, shown in U.S. Pat. No. 5,560,102 entitled "Panel and Fuselage Assembly" by Micale and Strand, has proven to produce far more accurate assemblies with much less rework. Application of the determinant assembly process in airplane wing manufacture should yield a better process that eliminates or minimizes the use of hard tooling while increasing both the production capacity of the factory and increasing the quality of the product by reducing part variability while reducing the costs of production and providing flexibility in making fast design changes available to its customers. These improvements would be a great boon to an airframe manufacturers and its customers and would improve the manufacturer's competitive position in the marketplace. The present invention is a significant step toward such a process.

SUMMARY OF THE INVENTION

Accordingly, it is an object of this invention to provide a method of manufacturing large and heavy assemblies, such as airplane wings, from flexible and semi-flexible parts and subassemblies in accordance with an original engineering design, free from reliance on conventional "hardpoint" tooling to determine the placement of the parts relative to one another and the contour of the assembly.

Another object of the invention is to provide a method of manufacturing airplane wings using intrinsic features of the component parts to allow them to self locate and determine assembly dimensions and contours rather than using the dimensions and contours of conventional tooling to determine assembly dimensions and contours.

It is yet another object of this invention to provide a system for manufacturing airplane wings that is inherently more accurate than the prior art and produces structures in which the parts are consistently located more accurately on the structure with closer conformance to the tolerance specified by the engineering design.

It is yet a further object of the invention to provide a system for manufacturing airplane wings that is faster and less expensive than the prior art traditional techniques and requires less factory space and is less dependent upon the skill of workers to produce parts within the engineering tolerances specified.

Still a further object of this invention is to provide a method and apparatus which facilitates the manufacturing of subassemblies with a precision and repeatability that enables airplane wings to be built within tolerance specified in the original engineering wing design.

Another still further object of the invention is to provide a method for building airplane wings having a sequence of operations arranged to apply critical features to the detail parts or subassemblies after the wing or wing component has been distorted by operations that distort the wing or component, such as interference fasteners.

Yet another still further object of the invention is to provide a method of assembling a major assembly from distorted parts or subassemblies by accommodating their distortion with a probing routine that creates partial digital representation of the distorted part or subassembly, and compares it to the space in which it is to fit, then produces a best-fit orientation for the distorted part or assembly to minimize the effects of the distortion.

It is yet another still further object of the invention to provide a process for manufacturing an airplane wing wherein only the key characteristics of the components and the wing are controlled, and they are controlled only for as long as they are important, and then they are allowed to vary after they are no longer important.

These and other objects of the invention are attained in a system for assembling wings and other large, heavy assemblies from flexible and semi-flexible subassemblies using a method that utilizes spatial relationships between key features of detail parts or subassemblies as represented by coordination features such as holes and machined surfaces drilled or machined into the parts and subassemblies by accurate numerically controlled machine tools using digital data from original engineering product definition, thereby making the components and subassemblies themselves intrinsically determinant of the dimensions and contour of the wing.

DESCRIPTION OF THE DRAWINGS

The invention and its many attendant objects and advantages will become better understood upon reading the following detailed description of the preferred embodiment in conjunction with the following drawings, wherein:

FIGS. 2A-2F are schematic views of certain milestone steps in the process according to this invention for assembling components and subassemblies into a wing box in accordance with this invention;

FIG. 6 is a sectional elevation showing a rib fastened between spars in an airplane wing made in accordance with this invention;

FIG. 7 is an enlarged view of a junction between a stringer, a wing skin, a rib and a spar in a section of a wing made in accordance with this invention;

FIG. 8 is a sectional elevation of a side-of-body connection between a wing and an airplane fuselage in accordance with this invention;

FIG. 8A is a perspective view of the inboard end of a wing made in accordance with this invention showing the side-of-body fitting;

FIG. 10 is a perspective view of a completely assembled wing box according to this invention, omitting the side-of-body web to shown the interior of the wing box;

FIG. 11 is an enlarged perspective view of the inboard end of the wing box shown in FIG. 10;

FIG. 12 is an elevation, partly in section, of an edge gauge/clamp for positioning a spar relative to the edge of a wing panel and clamping it in position;

FIGS. 16 and 17 are elevation and plan views of flap supports attached to the rear spar and the lower wing panel;

DESCRIPTION OF THE PREFERRED EMBODIMENT

The invention is described as applied to a preferred embodiment, namely, a process of assembling airplane wings. However, it is contemplated that this invention has general application to the assembly of parts into major assemblies where adherence to a specified set of dimensional tolerances is desired, particularly—where some or all of the parts and subassemblies are flexible or semi-flexible.

Figure 1:
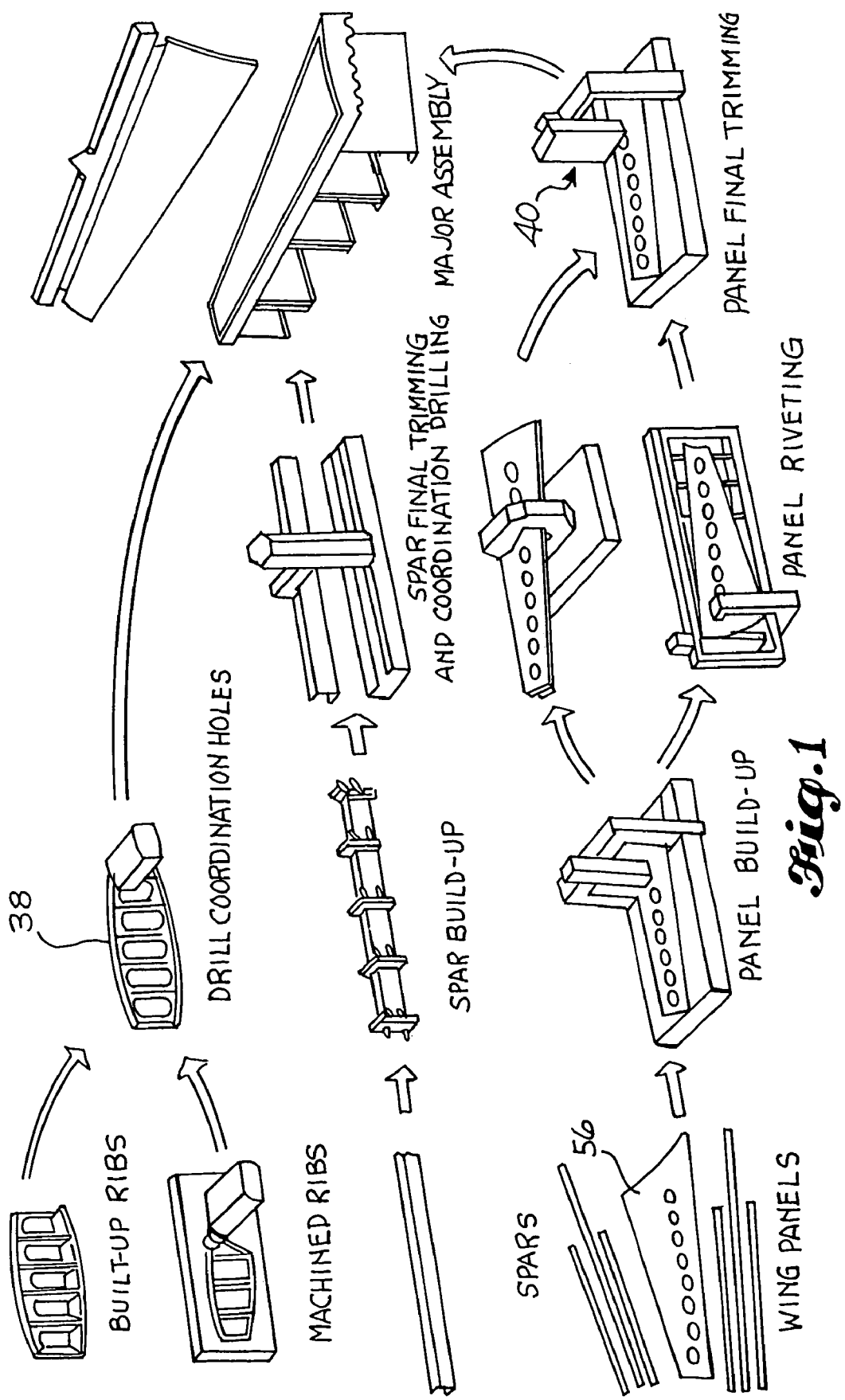
FIG. 1 is a top level schematic diagram of an assembly process for airplane wings in accordance with this invention.
Figure 2D:
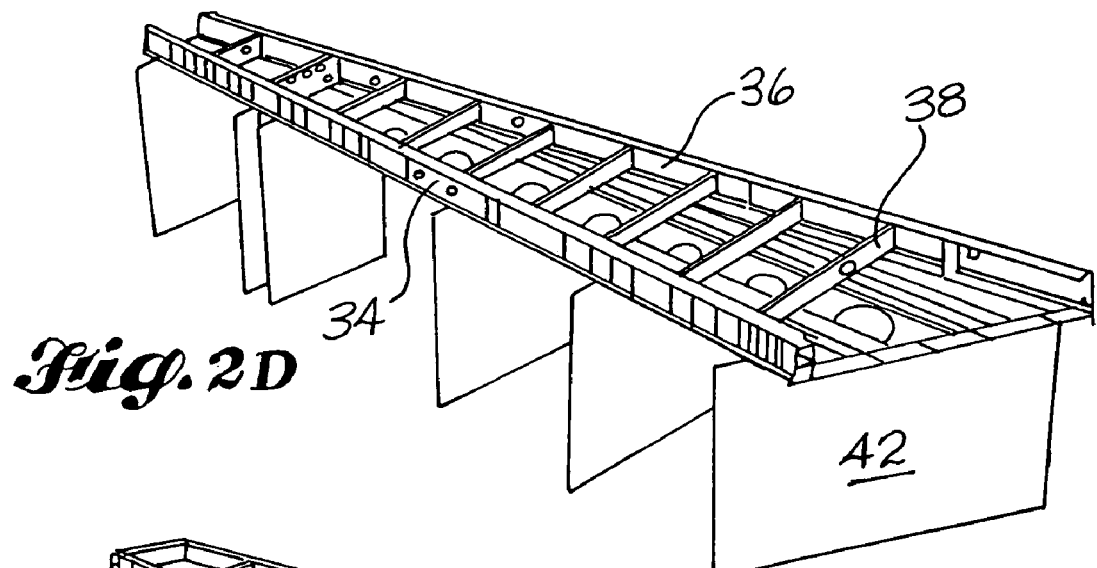
Figure 2E:
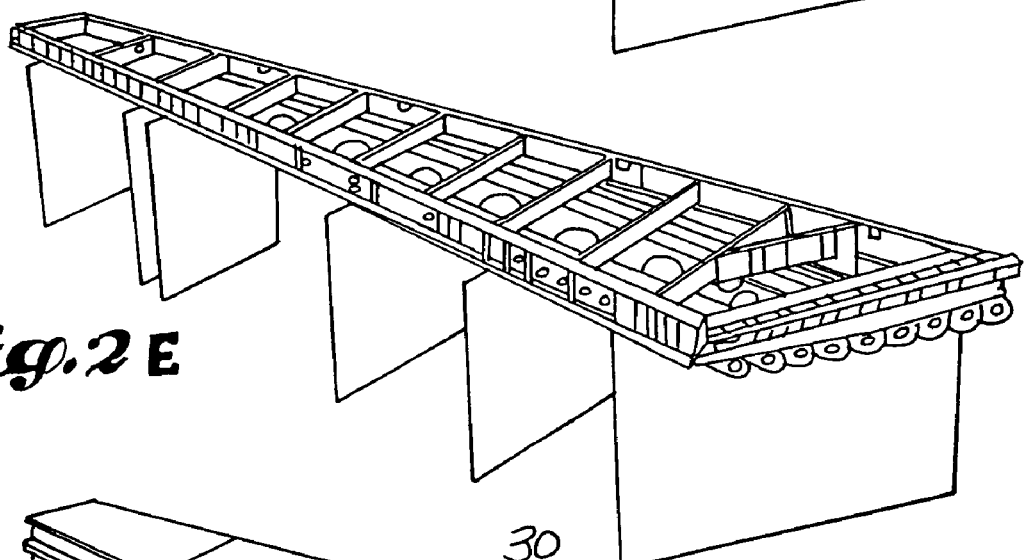
Figure 2F:
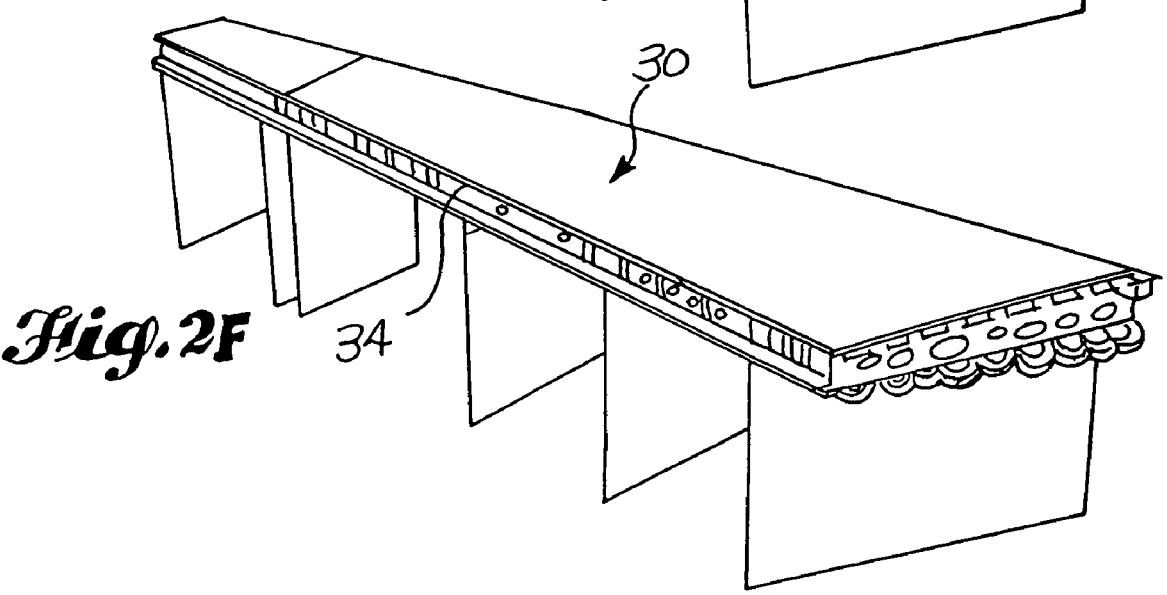

Referring now to the drawings, wherein like reference characters designate identical or corresponding parts, and more particularly to FIG. 1 thereof, top level schematic diagram illustrates the major process steps in the determinant wing assembly process according to this invention. The process begins with building the major components of the wing, including upper and lower wing panels 30 and 32, a rear spar 34 and a front spar 36, and in-spar ribs 38. The major components are brought together on a computer numerically controlled machine tool 40 and assembled as a wing in the horizontal position, as illustrated in FIG. 2, on a series of holding fixtures 42 mounted on a bed 44 of the machine tool 40. The lower wing panel 32 is positioned on the holding fixtures 40, and the spars 34 and 36 are positioned adjacent trailing and leading edges of the lower wing panel 32. The ribs 38 are positioned between the spars 34 and 36 and are fastened to the spars and to the lower wing panel 32, and the spars 32 and 34 are also fastened to the lower wing panel 32. Three engine strut fittings 250 are fastened to the underside of the wing box with fasteners extending through the lower wing skin and into internal load fittings 48 fastened to the designated ribs, and a bearing 208 for a landing gear link 212 is attached to the rear spar, along with a forward trunnion fitting 210, as shown in FIG. 10. The wing is closed out by fastening the upper wing panel 30 to the front and rear spars and to the ribs 38. The process for performing these steps is described in detail below.

Conventional fasteners are contemplated for use in the preferred embodiment. These conventional fasteners, such as rivets, bolts, lock bolts, Hi-Locks and the like are widely used in the aerospace industry, and are well understood and reliable. However, this invention is not restricted to the use of conventional fasteners and is fully compatible with the use of advanced fastening techniques such as co-curing and other bonding techniques for thermoset composite parts, induction welding of thermoplastic parts, as described in patent application Ser. No. 08/367,546 entitled "Multipass Induction Heating for Thermoplastic Welding" filed by Peterson et al., and friction welding of metallic parts as described in a PCT International Application No. WO 93/10935 when these processes become sufficiently understood, reliable and proven for use in flight critical hardware.

The tooling, such as the holding fixtures 42, used in the process is primarily for supporting the components and parts for drilling and machining by the machine tool 40, such as a Henri Line gantry mounted 5-axis tool, or a Cincinnati Milacron vertical tower 5-axis machine tool. Other machine tools of similar capabilities could also be used. The required capabilities are precision and repeatability in spindle positioning, which in this application is about ±0.005", and operation under control of a machine controller that can be programmed to incorporate digital product definition data originating from an engineering authority for the wing and wing components, so that coordination features specified by the digital product definition can be placed accurately and repeatably by the machine tool 40. These two capabilities enable the machine tool 40 to apply coordination features, such as coordination holes and machined coordination surfaces, to parts, components and assemblies at precisely accurate positions specified in the digital product definition. These coordination features are used to position parts and components relative to each other where they are pinned and fastened, thereby eliminating or drastically reducing the need for fixed hard tooling that previously was used to located the parts and components relative to each other. The coordination features thus determine the relative position of the parts and components that comprise the assembly, and thereby determine the size and shape of the assembly, independently of any tooling.

Wing Panel Build-Up

Figure 3:
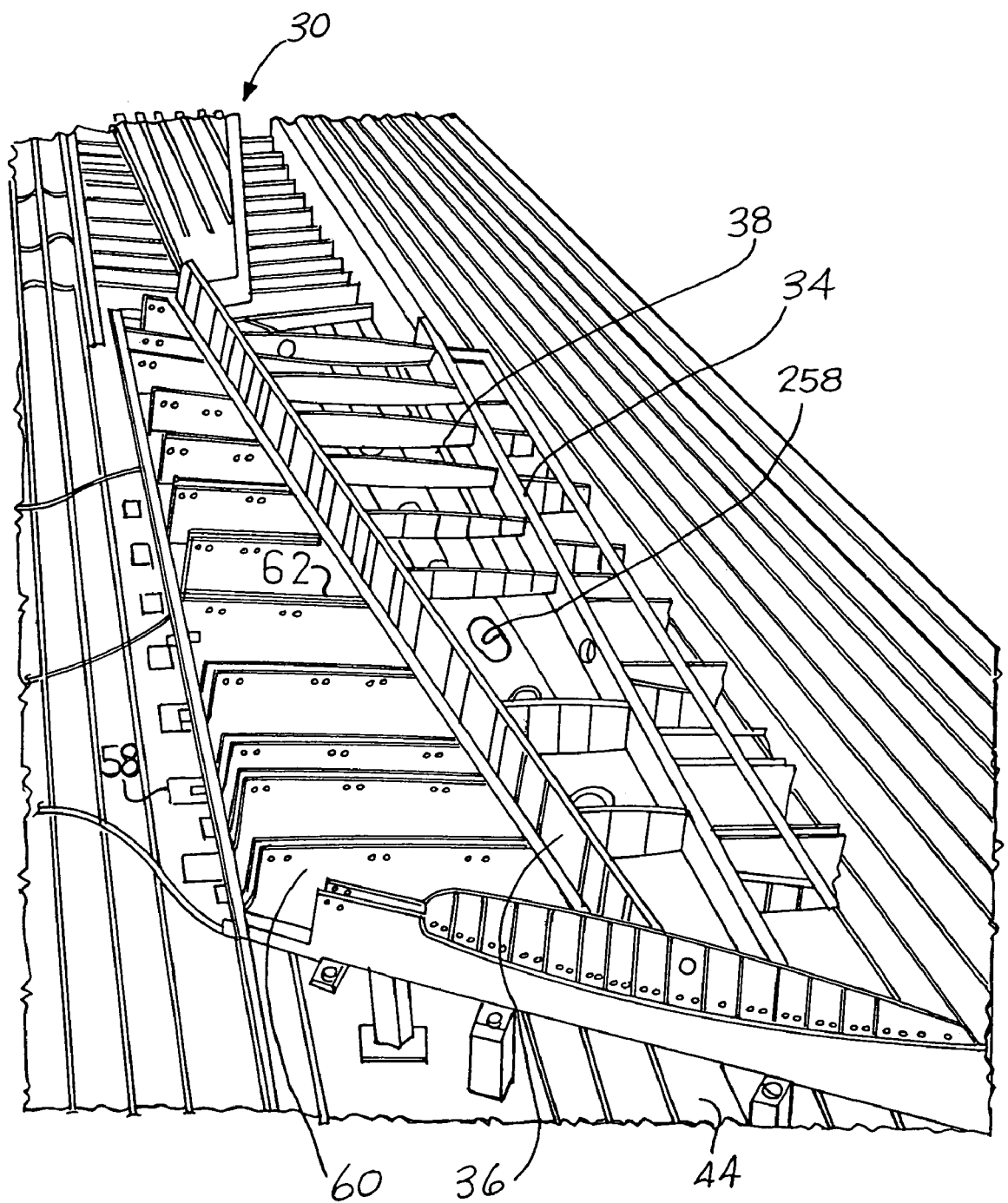
FIG. 3 is a perspective view of a portion of a wing majors assembly cell in accordance with this invention.
Figure 4:
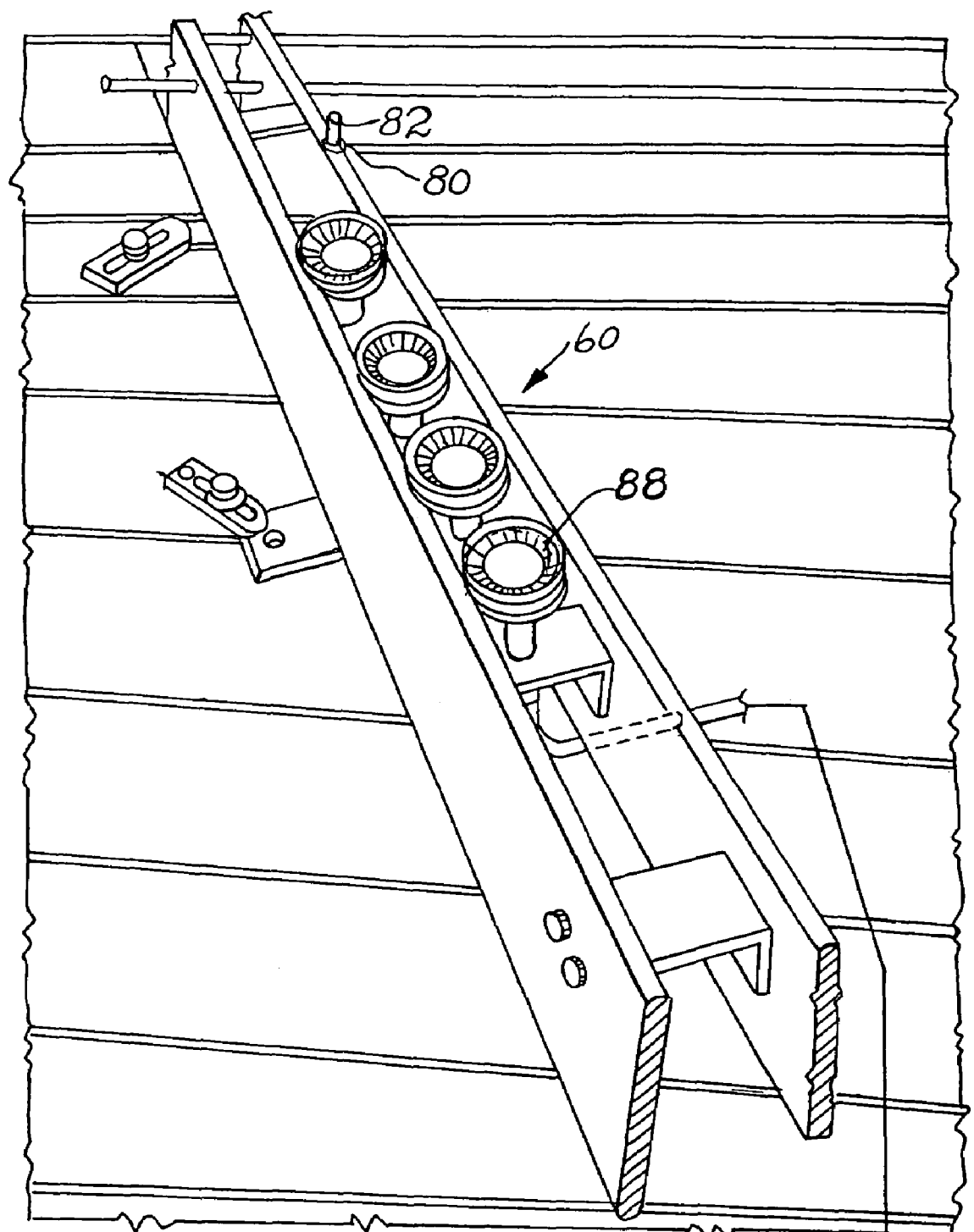
FIG. 4 is a perspective view one of the headers shown in the wing majors assembly cell FIG. 3.
Figure 5:
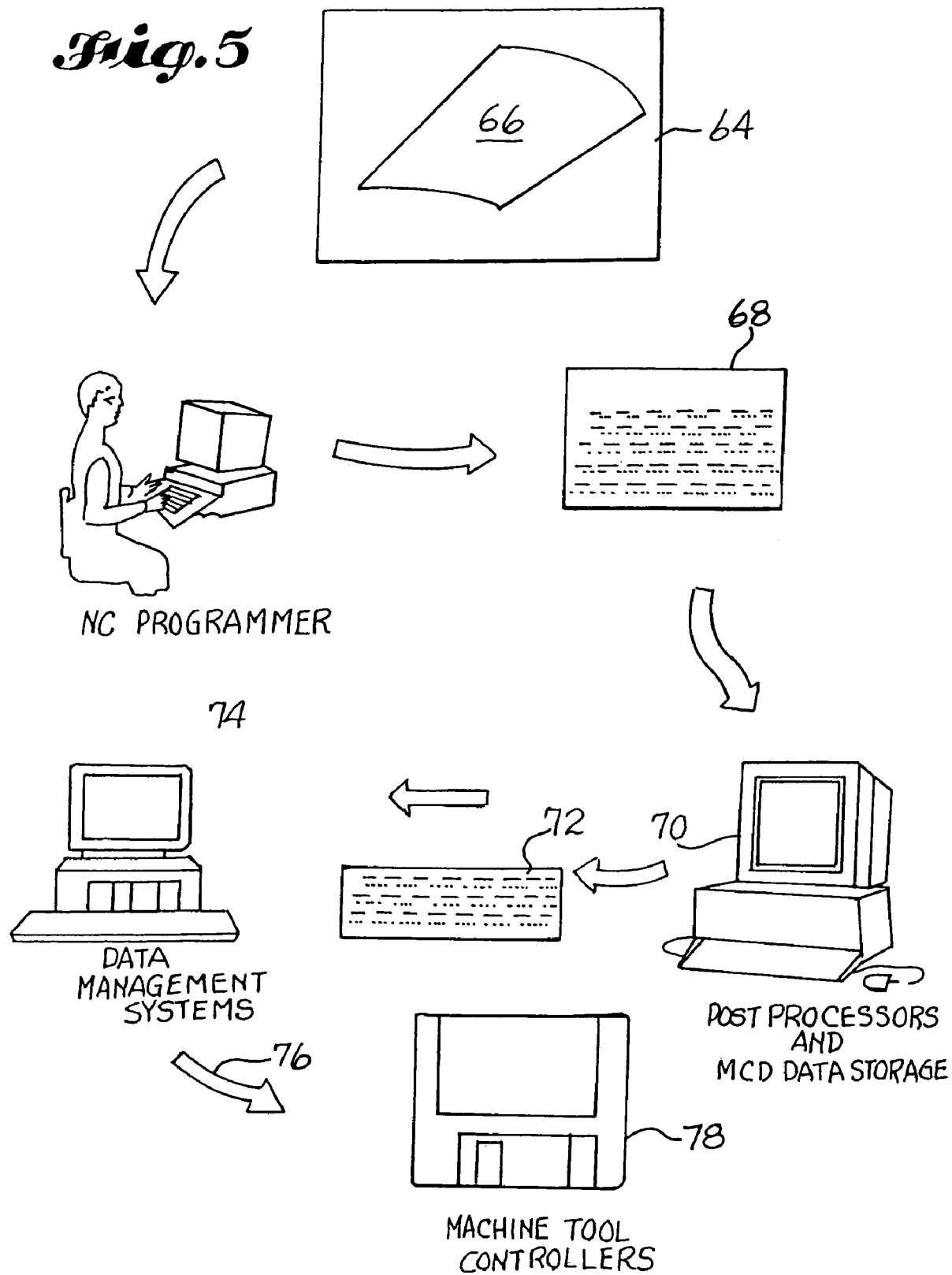
FIG. 5 is a schematic view of a computer architecture and process for converting data from a digital product definition to instruction in a machine tool controller for perform certain assembly operations.
Figure 9:
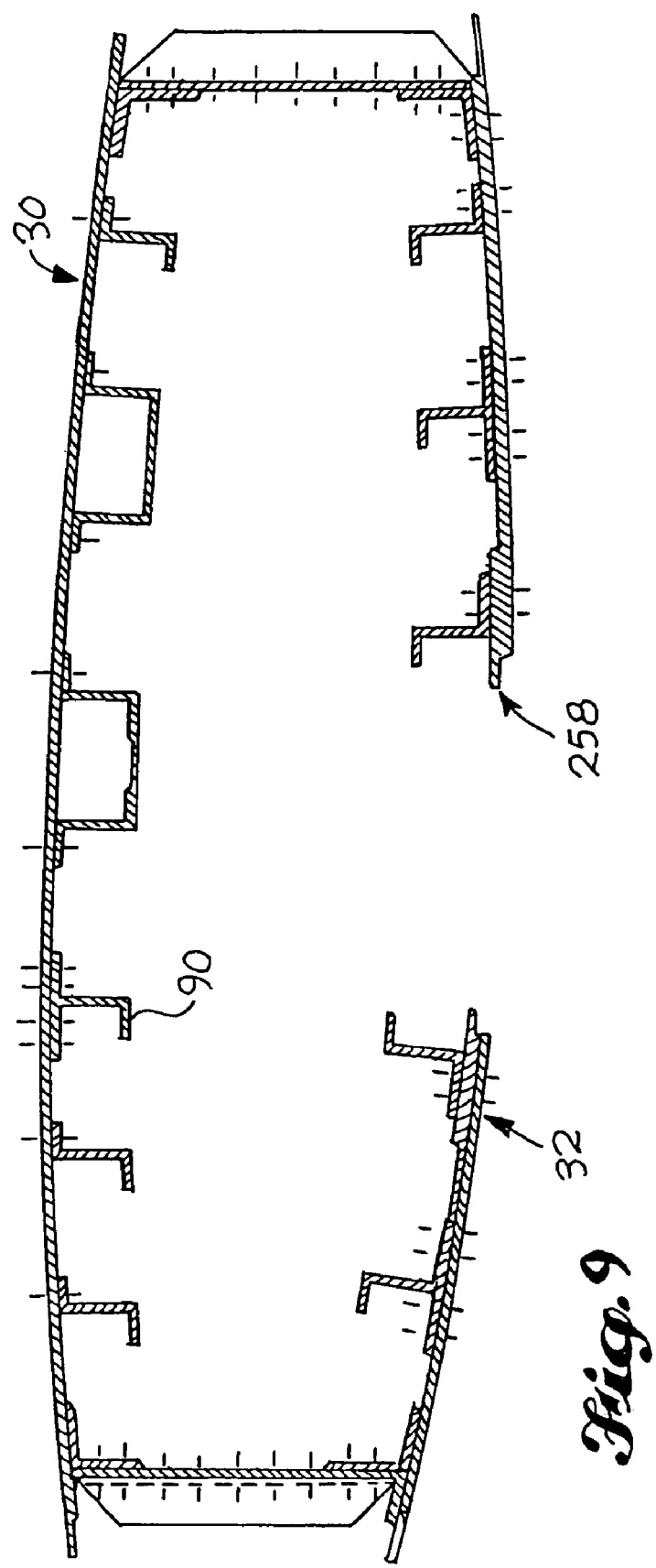
FIG. 9 is a sectional elevation of a partially assembled wing box showing the spars bridged by top and bottom wing panels with attached stringers, but omitting the ribs for clarity of illustration.

Wing panel build-up begins with erection of the holding fixtures 42 on the machine tool bed 44. The holding fixtures 42 can be any of a multitude of designs that will support several wing skin planks 54 which together make up the lower wing skin 56. The planks 54 are supported in generally horizontal or lying down position, with the lower surface, or "outer mold line" conforming to the wing panel profile specified in the engineering design. The preferred embodiment of a set of holding fixtures 42 is shown in FIG. 3. Each holding fixture includes a sturdy base structure 58 supporting a header 60 on which the wing planks 54 lie, with their outer surfaces in contact with a contact pad 62 on the top of the header 60. The contact pad 62 is a strip of durable, non-abrasive material such as ultra high density polyethylene, polyurethane, or Teflon which will support the wing planks 54 without deflection under compression, but will not scratch the surface coating on the wing skin planks 54. After the holding fixtures 42 are mounted for the first time on the machine tool bed 44, the machine tool 40 is used to machine the contact pads 62 to the exact contour specified by the engineering design, using the data from the digital product definition.

The digital product definition is the ultimate engineering authority for the product, in this case, a particular model airplane. It exists on a master computer 64 in a computer-aided design program as a digital model 66 which includes all the dimensions, tolerances, materials and processes that completely define the product. The dimensional data from the model 66 is provided in a file to an NC programmer who uses it to create a dataset 68 and machine instructions, such as cutter type and size, feed speeds, and other information used by a controller of the machine tool 40 to control the operation of the tool. The dataset and machine instructions are launched in a post processor 70 where they are converted to a machine readable file 72 that is transmitted to a data management system 74 where it is stored for use by the machine tool controllers 78. On demand, the file 72 is transmitted over phone lines 76 or other known means of communication to the machine tool controller 78 for use by the controller in operating the machine tool 40.

The file 72 in the data management system 74 is used to program the machine tool controller 78 to direct the machine tool 40 to drill coordination holes and fastener holes and other precision machining and positioning operations described below. The machine tool 40 also drills holes into the headers 60 for three precision drilled bushings 80 into which are set precision ground alignment pins 82 for positioning the wing skin planks 54 at a known position on the headers 60. The position is not critical so the accuracy of the wing is not dependent on the accuracy of the registry of the wing skin planks 54 on the headers 60 since the planks are probed for their actual position on the headers 60 using a contact probe 84 mounted on the machine tool 40. A vacuum source 86 is energized to create a suction in a series of suction cups 88 on the headers 60 to secure the wing skin planks 54 in position against the contact pads 62 on the headers 60, and the contact probe 84 is moved by the machine tool 40 to probe the key coordination features on the wing skin planks 54. A suitable probe for this purpose would be a Renishaw contact probe Model No. RW486 made by the Renishaw Company in Onendagua, N.Y., although other probes available from other sources could also be used.

After probing of the key coordination features on the wing skin planks 54 to determine the actual position of the planks on the headers 60, the machine control program is updated or normalized to synchronize the data set from the digital product definition with the actual position of the wing skin planks 54 on the headers 60. The machine program is now initiated to drill coordination holes in the inboard end of the wing skin planks 54 common to coordination holes drilled in the inboard end of a series of longitudinal wing stringers 90. The stringers 90 extend longitudinally, or span-wise along the wing and serve to connect the several wing skin planks 54 into a single wing panel 32, and also to stiffen the panel. They also serve as the connecting structure between the in-spar ribs 38 and the wing skin 56, as discussed in more detail below. The stringers 90 are located spanwise on the planks 54 via the coordination holes, and the floating ends of the stringers 90 are located chordwise by the machine tool 40 as it progresses down the plank, drilling and fastening as it goes. The machine tool 40 can use a simple pin to engage the side of the stringer to position it chordwise, or can use a centering mechanism as shown in U.S. Pat. No. 5,299,894 or U.S. Pat. No. 5,477,596, both by Peter McCowin.

To ensure that the stringers 90 intersect the ribs 38 at positions within the designated tolerance limits, so that the wing panel 30 may be fastened to the ribs 38 without the use of shims and without stressing the wing panel, the stringers 90 must be fastened to the wing skin planks 54 accurately and consistently. The determinant assembly process is a capable process that enables the use of statistical process control to detect a trend toward an out of tolerance condition before bad wing panels 32 are produced so that corrective action may be taken. Accuracy of wing panel fabrication insures that the wing components will come together as intended without prestressing the parts and without cosmetic imperfections, and that the assembled wing will function aerodynamically as designed. Accurate placement of the stringers 90 on the wing panels 30 and 32 makes it possible to use smaller "pad-ups" or thicken areas on the chords 218 of the ribs 38 or 216 and stringers where the stringers are bolted to the rib chords 92, as shown in FIGS. 6 and 7, instead of the wide area pad-ups used conventionally to accommodate the variation in stringer placement. Smaller pad-ups reduces the weight of the rib chords and stringers and increases the load carrying capacity of the airplane.

Coordination holes are drilled in the stringers 90 at the inboard end. Preferably, the coordination holes are drilled when the stringers are initially fabricated, but they may also be drilled afterward on a dedicated fixture or even on the same machine tool 40 on the same or similar holding fixtures 42 before the wing skin planks 54 are laid in place. The specified locations of the stringer fastener holes, at which the stringers will be riveted to the wing skin planks, are in the machine tool control program, having been previously down-loaded from the data base on which the digital product definition resides. The machine tool program directs the drill head to the specified locations for these fastener holes, typically at one or more of the positions where rivets will be installed to secure the stringers to the wing skin planks to form the wing panels. The stringers can be drilled on a machine tool other than the machine tool 40, whereon the wing skin planks are positioned and drilled, but doing so introduces a possible source of error.

The stringers are fastened to the wing skin planks 54 to secure them together in a correctly assembled lower wing panel 32, but the final fastening of the stringers 90 to the wing skin planks 54 must be done before the assembly is a completed wing panel. Numerous wing panel riveting machines are known which can perform the drilling and riveting operations with the required accuracy and consistency of quality. One such machine is illustrated in patent application Ser. No. 08/386,364 entitled "Fastener Verification System" filed on Feb. 7, 1995 by Hanks et al. Another such machine is the yoke wing riveter shown in U.S. Pat. No. 5,033,174 issued to Peter Zieve. In addition, it is contemplated that the riveting of the stringers could be done on the same header 60s using upper and lower gantry mounted drill/rivet units, such as the structure shown in U.S. Pat. No. 5,231,747.

After all the rivets holding the stringers 90 to the wing skin planks 54 are installed, the wing skin is repositioned on the holding fixtures 42 by use of coordination holes in the wing panel 30 and the alignment pins 82 on the headers 60. Several reference surfaces on the wing panel 30, such as tool balls or reference pins installed in accurately drilled holes in the wing panel, are probed with the probe 84 in the machine tool 40 to determine the actual position of the wing panel 32 on the holding fixtures 42, and the machine program is normalized with the actual position of the wing panel 32 on the fixtures 42. A mill cutter is mounted in the machine tool 40 and the wing panel is trimmed to the exact edge dimensions specified in the digital product definition to ensure that the dimensions on the wing are as specified, despite growth in length and width because of the numerous rivets installed during the riveting of the stringers 90 to the wing skin 32. This step is in accordance with one of the principles of the invention, namely, that the application of critical self tooling features in the parts and assemblies are postponed until after the part is distorted by upstream processes. That is, edge machining and other trimming operations could have been performed before fastening the stringers 90 to the wing skin planks 54, but doing so would have required an estimation of the anticipated growth that the assembly would undergo during riveting. These estimations can be quite accurate and have been made successfully for many years, but there is always a slight unpredictability factor because of the variation in the parameters of the process for installation of rivets, lock bolts, Hi-locks and other interference fasteners, such as exact hole diameter or hole roundness because of drill bit wear, slight variations in the countersink depth of the rivet hole because of the machine settings, and slight variations in rivet diameter. Even when these parameters are all well within tolerance, the variations in the rivet interference they produce in the installed rivet can accumulate in a large part such as a wing panel to produce variation in the assembly dimensions that can be significant. The effects of these variations can be eliminated by scheduling the application of critical features on the parts and assemblies after the distortion by assembly and manufacturing processes such as installing interference fasteners, heat treating, and shot peening.

As shown in FIGS. 8 and 8A, a T-chord 100 is positioned on the inboard edge of the lower wing panel 32 by aligning coordination holes accurately drilled in an outboard flange 102 of the T-chord with corresponding coordination holes drilled in the inboard edge of the wing panel. Accurate placement of the T-chord is important because, in part, it determines the position of the wing on the airplane, and also because a vertical flange 104 on the T-chord must align in a flat vertical plane with corresponding flanges on other wing structure, to be described below, for attachment of a side-of-body web 106. The web is sealed to the flanges and is the inboard structure of the wing fuel tank, so the flanges must align with a small tolerance for proper fitting of the side-of-body web 106.

A paddle fitting 108 is positioned over the T-chord flange 102 by aligning coordination holes predrilled in the paddle fitting with the aligned coordination holes through the T-chord flange and wing skin. The T-chord and paddle fitting are clamped in place using temporary fasteners through the coordination holes, and full sized fastener holes are drilled through the assembly. A series of vertical vanes 110 on the paddle fitting is positioned to lie flush against a flat face on each of the lower wing stringers 90, and is clamped thereto and back drilled with full sized fastener holes. The paddle fitting 108 and T-chord 100 are disassembled and deburred, and the holes are coldworked to improved their fatigue life, since the T-chord and paddle fitting are part of the connection of the wing to the wing stub in the airplane fuselage, and the connection experiences high stress and fluctuating loads. The T-chord 100 is coated with sealant and is attached to the inboard edge of the lower wing panel 32 with bolts 112.

The upper wing panel 30 is the last major subassembly to be added to the wing box, and is installed only after the lower wing box has been built. However, the upper wing panel 30 may be built in parallel with the lower wing panel 32, or whenever the scheduling best coincides with the availability of manpower. The upper wing panel 30 is very similar in its construction and assembly processes to that of the lower wing panel 32, so it will not be separately described. One exception is the design of the component, called a "double-plus chord" 116, by which the wing is attached at its upper wing panel 30 to the wing stub (not shown) in the airplane fuselage. The double-plus chord 116, also shown in FIG. 8, has upper and lower vertical flanges 118 and 120 which are fastened to the fuselage skin 122 and to the side-of-body web 106, respectively, when the wing is attached to the airplane. Two additional vertically spaced sideways projecting flanges 124 and 126 on each side of the double-plus chord 116 engage the wing stub on the inboard side and receive the inboard end of the upper wing panel 30 on the outboard side of the double-plus chord. Coordination holes drilled through the upper wing skin and the stringers 90 at the inboard end align with corresponding coordination holes drilled in the sideways projecting flanges 126 to position the upper side of the wingbox properly when it is attached to the wing stub.

In-spar ribs 38 are fabricated and brought to the wing major assembly area for assembly into the wing. Ribs 38 are of basically two types: machined ribs and built-up ribs. Machined ribs are machined out of a solid slab of aluminum and have the benefit of greater dimensional accuracy. However, until the advent of high speed machining which makes possible the machining of thin walled structures without the problem of distortion due to localized heating from the cutter, it had been necessary to make the structure heavier than required by engineering analysis for anticipated loads, to prevent heat distortion of the thin walls. The greater weight and the greater cost of the machined components has delayed the acceptance of monolithic machined ribs and other components, but new procedures are being developed to solve the problems that will permit wider use of these components in airplane structures.

Built-up ribs 214, shown in FIGS. 6 and 7, are made using the determinant assembly processes of this invention by a process similar to that used to make wing spars, disclosed in the first-mentioned U.S. Provisional Application and in our companion application entitled "Determinant Spar Assembly" filed concurrently herewith. A rib web 216 is cut from a sheet of aluminum using a machine tool such as a gantry-mounted machine tool programmed to drive a cutter around the profile of the rib web 216. The rib web profile data is input to the machine tool drive program from the engineering authority responsible for the digital product definition for the wing and the ribs. The position of upper and lower rib chords 218 and 220 on the rib web 216 determine the height profile of the rib 214 and hence the chord-wise profile of the wing, so they must be accurately positioned on the rib web 216. The rib chords are accurately positioned on the rib web 214 using an accurate positioning and clamping technique such as that shown in the aforesaid Provisional Application and PCT Application entitled "Determinant Spar Assembly". Fastener holes are drilled through the clamped rib web 216 and rib chords 218 and 220 and interference fasteners are inserted and secured. After the fasteners are secured and the rib is fully distorted by the interference fasteners, the rib web 216 is end trimmed to the designated length. Coordination holes are drilled in the two ends of the rib 214 for fastening to the rib posts 204 on the wing spars. The locations of the rib post coordination holes are accurately set using a machine tool such as machine tool 40 having a controller programmed with the coordination hole locations from the digital rib definition.

Phenolic washers 222 shown in FIG. 7 are bonded to the rib chords 218 and 220 at the positions of contact between the rib chords and the stringers 90. These washers are made slightly thicker than needed and are machined to the correct thickness by the machine tool on which the ribs are made, or another machine tool of suitable accuracy, to give the ribs 38 the correct height as designated in the digital parts definition of the ribs. The phenolic washers 222 form a bearing surface between the ribs 38 and the stringers 90 to accommodate relative movement between the ribs 38 and the wing panels 30 and 32 when the wing flexes during flight. The washer in this bonded application also serves as a pad of sacrificial material that can be trimmed to make the height of the ribs 38 exactly as specified in the digital parts definition of the ribs.

Wing major assembly is performed on the holding fixtures 42 after the stringers 90 are all fastened to the wing panel 30. The wing panel is placed, stringer side up, on the holding fixtures 42 and moved into position to align at least one coordination hole in the wing panel with a corresponding location hole in one of the headers 60. Conveniently, the wing panel 30 can be floated on an air cushion by connecting a source of air pressure to the lines in the headers 60 that normally supply vacuum to the suction cups 88. When the wing panel 30 is positioned accurately on the headers 60, an index pin is inserted through the coordination hole or holes in the wing panel and headers 60, and the vacuum cups 88 are connected to the vacuum source 190 to pull the wing panel 30 against the contact pads 62 on the headers 60 and hold it securely in place.

The wing panel 32, when positioned and secured to the headers 60, is probed with the touch sensitive probe 84 to locate the coordinating features such as the tool ball or features machined into the wing panel, such as coordination holes. The predetermined locations of the features which are probed on the panel 30 were recorded in the digital part definition, and the actual locations as probed are compared with the predetermined locations. The machine program is normalized to conform to the actual position of the panel on the headers 60 so that subsequent operations are performed accurately on the panel at its actual position.

A program in the controller of the machine tool 40 is initiated to drive a machining cutter around the edges of the wing panel to net trim the panel 32 to size. Performing this net trim operation after all the stringer fasteners have been installed, instead of beforehand, eliminates the size distorting effect of the many stringer fasteners, so the dimension of the wing panel 30 is precisely as specified in the product definition.

Attaching the Spars and Ribs

The machine tool controller 78 is programmed with the locations of coordination holes at the inboard ends of the front and rear spars 36 and 34, and holes in the stringers 90 of the lower wing panel 32 for rib-to-stringer bolts, and the machine tool drills these holes, after which the gantry is withdrawn. Sealant is applied to the bottom chord of one of the spars, and the spar is placed on the edge of the wing panel with the inboard coordination hole aligned with a coordination hole drilled in the wing panel. The other end of the spar is accurately positioned relative to the edge of the wing panel using one or more gauge/clamps 224, shown in FIG. 12, that are accurately machined for that purpose. A second coordination hole at the outboard end of the wing panel could also have been used, but it is the edge relationship between the spar and the wing panel that is important at this point, not the length of the spar. A principle of the invention is to control dimensions that are important, but only while they are important; the spar length is not important at this stage of the assembly, so only the edge relationship of the spar to the wing panel is controlled. A coordination hole, which would have to register lengthwise of the spar as well as chord-wise from the edge of the wing panel 30, has an unnecessary required degree of precision, so the edge gauges are preferred over a coordination hole for the outer end of the spar.

The gauge/clamps 224 shown in FIG. 12 each include a body 226 having an upturned flange 228 at one end and a shoulder 230 intermediate the body 226. The upturned flange 228 has an end facing surface 232 that is accurately ground to match the angle of the spar web 132, and the shoulder 230 is accurately ground so that the distance between the facing surface 232 and the shoulder is exactly the same as the desired distance between the rear surface of the spar web 132 and the trailing edge of the wing panel 32 at the position set for that gauge/clamp 224. A temporary fastener such as the cleco fastener 234 illustrated in FIG. 20 fastens the gauge/clamp 224 to the lower edge of the spar 34 through a hole drilled through the upturned flange 228 and through the web 132 and lower chord 136 of the spar 34.

After the spar 34 is pinned to the inboard end of the lower wing panel 32 and positioned in the approximate position relative to the edge of the wing panel, the gauge/clamps 224 are attached to the lower edge of the spar 34 and the shoulder 230 is snugged against the trailing edge of the lower wing panel 32. A screw 236 in the end of a pivotally mounted arm 238 of a toggle clamp 240 is tightened against the underside of the wing panel 32 to secure the clamp to the wing panel 32 and hold the spar 34 down against the upper surface of the wing skin 56.

Either the front spar 36 or rear spar 34 could be placed first on the wing panel 32. In this first embodiment, the rear spar 34 is placed first as a matter of convenience, but in a production operation wherein the front spar 36 is attached with the leading edge fittings already attached, it may be desirable to attach the front spar first while supporting the forward cantilevered weight of the leading edge fittings with jib cranes.

Figure 13:
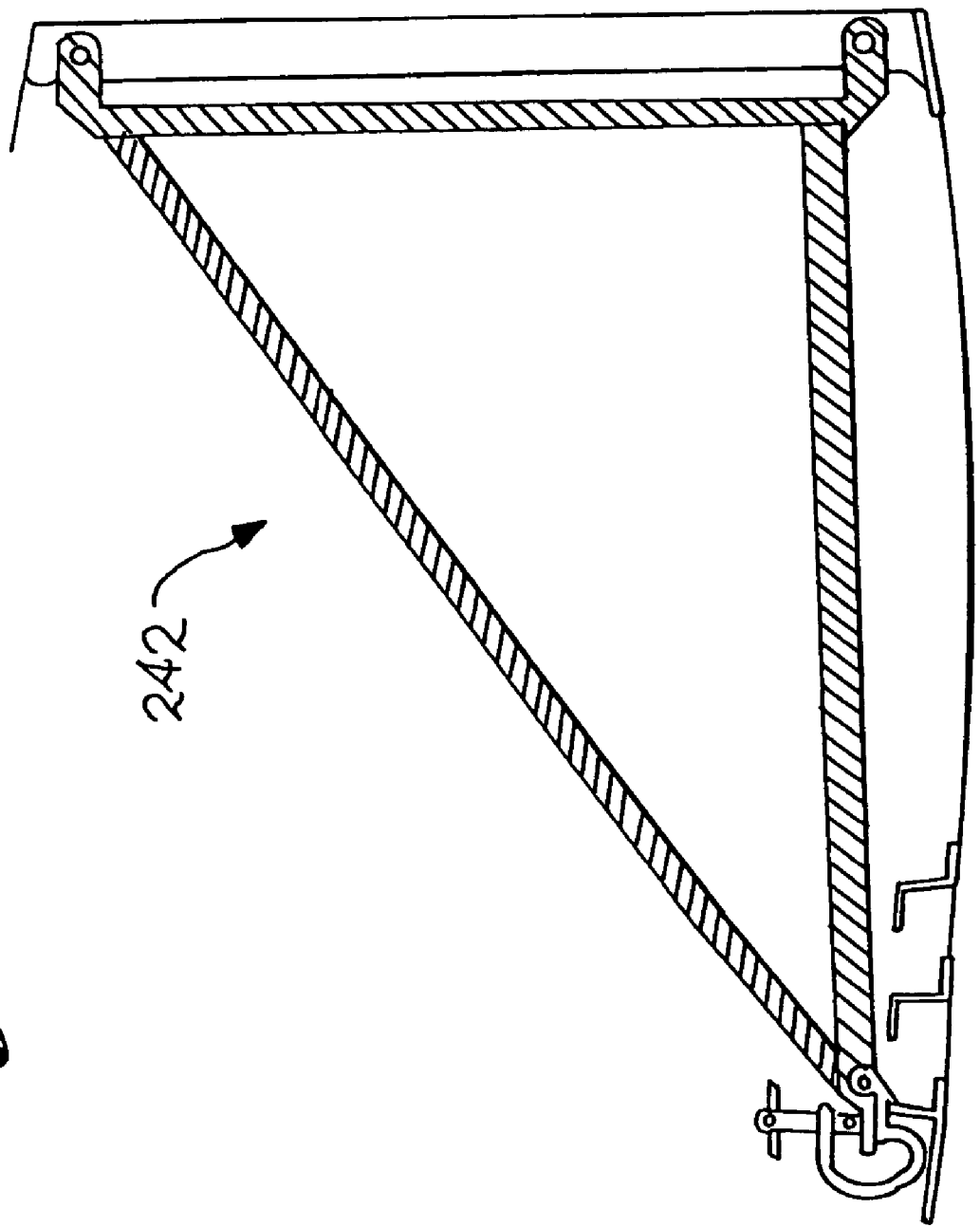
FIG. 13 is an elevation of a temporary spar support used in the process of this invention.

The first-attached spar is secured in place by clamps and/or temporary fasteners such cleco removable fasteners. If the front spar with leading edge fittings is attached first, temporary spar supports such as the triangular structures 242 shown in FIG. 13 are pinned to the rib posts 204 and clamped to stringers 90 on the lower wing panel 32 to react the overturning moment exerted by the weight of the leading edge fittings, and to hold the spar in position during rib placement.

Certain of the ribs 38 are placed on the stringers 90 and are pinned to the rib posts 204 through the coordination holes predrilled in the rib posts 204 and the ends of the ribs 38. These are the ribs that would be difficult to maneuver into position between the front and rear spars 34 and 32 after both front and rear spars are attached to the wing panel 32. Sealant is now applied to the bottom chord of the other spar and it is laid on the wing panel 32 adjacent the other edge, and the coordination hole in the inboard end of that spar is aligned and pinned to the corresponding coordination hole in the wing panel 32. The ends of the ribs 38 already in place are pinned to the rib posts 204 of the second spar, and that spar is clamped in place at the position determined by the length of the ribs 38. The other ribs 38 are all placed between the spars and are pinned in place to the spars on their respective rib posts 204.

The ribs are fastened to the rib posts by clamping the ribs to the rib posts and removing the coordination pins or temporary fasteners one by one, then drilling and reaming the aligned coordination holes to full size for insertion of the permanent fasteners. Alternatively, the coordination holes could be drilled at nearly full size so they merely need be reamed in an operation that is quick and produces quality holes for the fasteners. As the fastening of the ribs to the spar rib posts proceeds, the temporary spar supports 242 are removed.

The accurate placement of the spars on the edges of the wing panel, and the accurate attachment of the ribs to the rib posts on the spars ensures that the wing box, formed of the spars, ribs and two wing panels, will be made accurately in accordance with the digital wing product definition. Variations in the dimensions of wing boxes made using prior art processes caused difficulties in mounting the control surface structures such as leading edge slats and trailing edge flaps, and also caused difficulties in attaching the wing to the airplane. These difficulties are largely eliminated with wing boxes made in accordance with this invention because of the small tolerances to which assembly dimensions can be held. The ability to produce wings to designated engineering tolerances enables for the first time the use of advanced tolerancing techniques in wing manufacturing, such as that disclosed in PCT Application No. PCT/US96/10757 by Atkinson, Miller and Scholz entitled "Statistical Tolerancing". Economies achieved in the factory by reduction or elimination of rework alone may justify the capital cost of the equipment used to practice this invention and scrapping the conventional wing majors assembly tooling.

Rib bolt fasteners 244 shown in FIG. 7 are inserted in predrilled holes through the stringer pad-ups and phenolic washers 222 and the rib chord flanges. If the bonded phenolic washers are used, as in the preferred embodiment, they have already been machined to the correct height. If not, separate phenolic washers can be inserted between the stringer pad-ups and the rib chord before the rib bolts 244 are inserted. The holes predrilled in the rib chord flanges and the stringer pad-ups are slip fit holes to allow limited slip between the rib 38 and the stringer 90 on the wing panel 30 when the wing flexes in flight, so the tolerances on these rib bolt fastener holes can be somewhat more relaxed than the tolerances on the coordination holes which determine part positions in the assembly.

With the spars 36 and 34, and ribs 38 fastened together and aligned properly on the lower wing panel 32, the spars are now temporarily fastened in place. Clamps are applied, which preferably are part of the edge gauges 224 that set the position of the spars relative to the leading and trailing edges of the wing panel 32, as shown in FIG. 12. The clamps generate sufficient interfacial pressure between the spar lower chord 136 and the wing panel 32 to prevent interlaminar burrs from intruding in the spar/panel interface. Such burrs would interfere with a proper junction between the spar and the wing panel 32 and be very difficult to remove because of the sealant in the interface. Holes are drilled for temporary fasteners which are inserted to hold the spar in place during the permanent fasteners installation. The temporary fastener holes are drilled undersized so that as the full sized fastener holes are drilled, any creep in dimensions due to distortion from insertion of interference fasteners will be removed. Other techniques for holding the spars in place while they are being fastened could also be used in place of the temporary fasteners.

The spars are now fastened with permanent fasteners in place on the edges of the wing panel 32. The machine tool 40 drills holes in bottom flange 144 of the lower the spar chord 136 from the lower surface or skin side. If the particular machine tool 40 being used is not able to drill from below, it is directed to drill accurate pilot holes from above, which pilot holes are used to guide the drilling and countersinking of fastener holes from below by conventional power tools. Fasteners are inserted and tightened as the drilling proceeds, so any differential length growth between the spar and the wing panel is washed-out as the fastening proceeds along the length of the spar. Fasteners are not inserted in the holes adjacent high stress areas such as the engine strut fittings, landing gear attachment fittings, and the side-of-body rib because these holes are designated for cold working and it is inadvisable to cold work holes in the presence of wet sealant. The holes to be coldworked are left until later after the sealant has cured. Use of interference fasteners with a radiused lead-in minimizes the need for cold working the holes. After the sealant is cured, these holes in high stress areas are cold worked, reamed and countersunk and the fasteners are installed and tightened.

Figure 14:
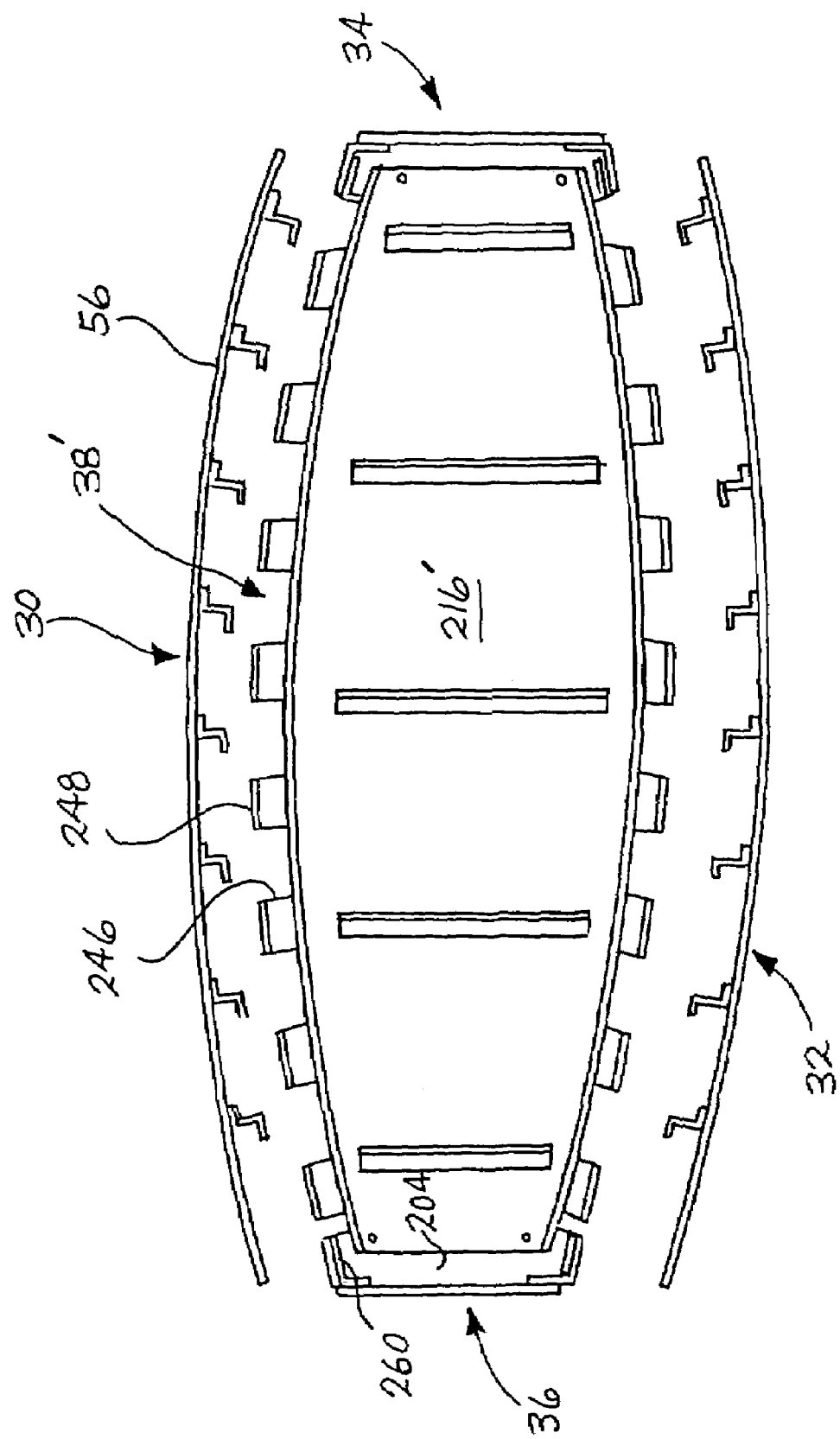
FIG. 14 is an exploded view of a wing box made in accordance with this invention, showing a shear tied rib fastened between two spars with the wing panels exploded away.

Next, the shear tied ribs 38' are fastened to the lower wing panel 32. As shown in FIG. 14, the shear tied ribs 38' have projections 246 that extend between the stringers and terminate in flanges or contact pads 248 that engage and are fastened to the underside of the wing skin 56. Pilot holes, predrilled in the pads 248 during fabrication of the shear tied ribs, are used by the mechanic for back drilling through the wing skin 56. It is not necessary to back drill at every pad since the purpose is to fix the position of the shear tied ribs which are flexible and, even though fixed at their ends at the rib posts 204 in the spars, can be flexed substantially in the spanwise direction until they are fixed in place to the stringers 90 and/or the wing skin 56. Temporary fasteners are installed to hold the shear tied rib 38' in place while the permanent countersunk fastener holes are drilled from the underside, that is, from the skin side up through the shear tie pad 248. The permanent fastener holes can be drilled by a counterbalanced ground based drilling unit operated by a mechanic, or preferably are drilled by a machine tool that probes the location of the pilot holes drilled at selected shear tie pads to normalize the digital data from the product definition data set with the actual position of the shear tie ribs as indicated by the pilot holes. The machine tool then drills and countersinks the permanent fastener holes. Prior to installation of the fasteners, the mechanic runs a "chip chaser", a thin blade-like tool, through the interface between the shear tie rib pads and the wing skin to remove any chips or burrs that may have intruded into that interface during the drilling. The fasteners are inserted from the skin side and secured by a mechanic on the inside who installs and tightens nuts or collars on the fasteners and tightens them with the appropriate power tool.

Figure 15:
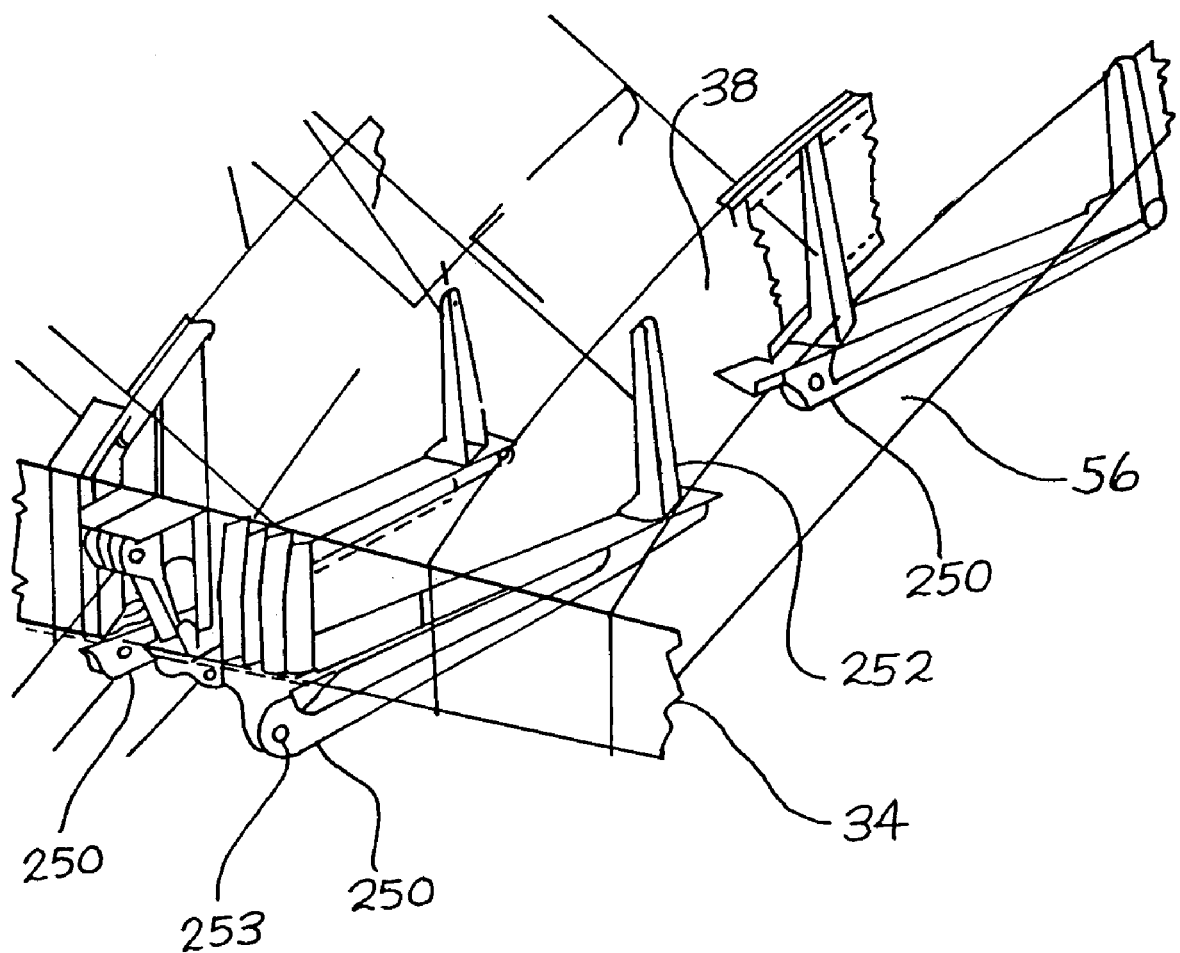
FIG. 15 is a perspective view of a wing box in phantom, showing the placement of engine strut fittings to the wing box.

As shown in FIG. 15, three strut fittings 250 are positioned on the underside of the lower wing panel 32 at the engine strut position and are indexed by way of coordination holes predrilled in the strut fitting 250 to coordination holes drilled in the wing panel with the machine tool 40. Internal load fittings 252 are attached to the ribs 38 by way of accurately drilled coordination holes predrilled during rib fabrication, and the strut fittings 250 are attached to the internal load fittings 252 by fasteners which extend through holes in wing skin 56 and aligned holes through the foot of the internal load fitting 252. The forward two strut fittings are fastened to the bottom spar chord by fasteners extending through holes drilled accurately by the machine tool 40 using digital product definition data to inform the controller 78 of the machine tool 40 as to the locations of those fastener holes. It is important that the strut fittings 250 be accurately placed on the wingbox since they support the fuse pins which carry the engine strut on the wing, and the axis of the fuse pin bores 253 must be properly aligned to ensure a trouble-free connection of the engine to the wing. The accurate drilling of the coordination holes using data from the digital wing product definition from the ultimate engineering authority ensures that the engine strut fittings 250 will be accurately positioned, thereby eliminating or minimizing any down stream problems that would have been produced by mispositioned strut fittings. Temporary fasteners are inserted in some of the aligned coordination holes to hold the engine strut fittings and internal load fittings in position while permanent fastener holes are drilled. The drilling can be done by hand held power drills, but preferably is done with the machine tool 40. If the holes are to be cold worked, the strut fitting is removed, deburred and the fastener holes in the wing panel, the ribs, and the strut fitting 250 are coldworked and reamed. Faying surface sealant is applied and the strut fitting is returned to its place and the fasteners are inserted and tightened by the mechanic.

As shown in FIGS. 16 and 17, flap reaction fittings 254 are attached to the underside of the lower wing panel 32 by aligning coordination holes predrilled in the flap reaction fittings 254 and corresponding coordination holes in the wing panel, drilled from above by the machine tool 40. These coordination holes can be full sized fastener holes since they are not used as pilot holes for back drilling or as temporary fastener holes. The holes are cold worked and reamed, and the fasteners are installed and tightened to secure the flap reaction fittings in place. Corresponding flap support fittings 256 are attached to the rear spar 34 during spar build-up by aligning coordination holes 257 predrilled in the flap support fittings 256 and the spar web 132 and fastening them together in the aligned position.

Wing close-out involves attachment of the upper wing panel 30 to the wing box frame. Sealant is applied to the flanges of the upper spar chords 134, and the upper wing panel 30 is lifted by crane and lowered onto the assembled spars and ribs of the lower wing box assembly. The upper wing panel 30 is indexed to the inboard end of the spars by way of a coordination hole predrilled into the inboard end of the wing panel 30 during panel build-up, and a corresponding coordination hole drilled into the inboard end of the spar, preferably in the terminal end fitting 206 during spar build-up. Another pair of coordination features on the upper wing panel 30 and the lower wing box assembly are positioned relative to each other to fix the position of the upper wing panel 30 uniquely on the lower wing box assembly. This other pair of coordination features could be coordination holes in the edge of the upper wing panel and in the upper spar chord 134 of the front or rear spar 36 or 34 or, preferably, a coordination surface on the front edge of the upper wing panel and the corresponding edge of the front spar, positioned relative to each other with an edge locator tool and clamp like the gauge/clamp 224 shown in FIG. 12.

The proper positioning of the upper wing panel 30 on the lower wing box ensures that the vertical flange 120 of the double plus chord 116 on the inboard edge of the upper wing panel 30 aligns in a vertical plane with the vertical flange 104 of the T-chord 100 on the inboard edge of the lower wing panel 32, and also with the inward flanges on the terminal end fittings 206 on the front and rear spars 36 and 34. The alignment of these four flanges ensures that the side-of-body rib web 106 will lie flat against all four flanges and will seal reliably and permanently thereto when it is attached.

The upper wing panel 30 is clamped in its properly indexed position using edge clamps like the clamps 224 shown in FIG. 12 or the like. Rib bolts 244 are inserted through predrilled holes in the upper rib chords and the stringers 90, as shown in FIG. 7. Because the wing box is now closed by the upper wing panel 30, access to the interior of the wing box is through the access openings 258 in the lower wing panel 32. A small mechanic crawls into the wing box through the access opening 258 between each rib and inserts a rib bolt 244 into the aligned holes in the upper rib chords and the stringers 90, and tightens the bolts. The accurate control over the position of the stringers 90 when the wing panels are built up makes it possible for the rib bolt holes to be predrilled and line up with the rib bolt holes in the stringers 90 when the upper wing panel is properly positioned on the lower wing box, thereby eliminating the need for drilling the rib bolt holes from inside the wing box, and also making possible the use of much smaller rib and stringer pad-ups where they are fastened together by the rib bolts. Predrilling the rib bolt holes also has the benefit of accurately locating the midportion of the rib, which is somewhat flexible, properly along the stringers 90 spanwise on the wing.

With the upper wing panel 30 now firmly fastened to the ribs 38 and clamped to the spars 34 and 36, temporary pilot holes are drilled by the mechanic using a hand held power drill from the inside of the wing box up through shear tie flanges 260 at the top of the rib posts 204 and through the wing skin. Reaction force is exerted by the machine tool 40 during the back drilling to prevent the upper wing panel 30 from being lifted off the upper spar chord 134 by the force exerted on the drill during drilling of the pilot holes. Temporary fasteners are installed in the pilot holes to hold the wing panel 30 firmly against the spar chord 134 while the permanent fastener holes are being drilled so that no chips or burrs intrude into the interface between the spar chord and the upper wing panel. The exact control of the rib height and profile by controlling the position of the rib chords on the rib webs ensures that the height and contour of the ribs and the spar chords correspond closely so that the stringers 90 of the wing panel lies on the rib chords and the wing skin lies smoothly over the spar chords without any discontinuity that would require shimming.

The machine tool 40 is directed to the spar-to-wing panel fastener locations using data from the digital wing product definition which specifies the locations and sizes of the fasteners. The fastener holes should be exactly normal to the surface of the wing skin so that the countersink axis is also normal to the wing skin at the fastener location. A conical head fastener inserted in a fastener hole properly drilled normal to the surface of the wing skin at the fastener location will lie in the countersink with its head flush with the surface of the wing skin. Such a fastener in a non-normal fastener hole would have one edge of the fastener's conical head protruding from the countersink, and the opposite edge recessed below the surface. There is almost nothing that can make a fastener improperly installed in this way acceptable. Shaving the head removes the protruding edge, but leaves that side of the head too narrow. The recessed edge of the head remains recessed and shaving or sanding the wing surface is not an acceptable fix. To ensure that the fastener holes are drilled normal to the wing surface, a self-normalizing drill head may be used, as shown in U.S. patent application Ser. No. 08/785,821 filed on Jan. 8, 1997 by Gregory Clark entitled "Self-Normalizing Drill Head".

The machine tool 40 drills and countersinks the fastener holes and inserts the fasteners. A mechanic inside the wing box installs the nuts or collars and tightens the fasteners with a power tool as the fasteners are inserted. The holes are drilled and countersunk in the wing skin, and the holes extend through the top flange on the spar chord. A pressure foot on the drill head exerts a press-up force to assist the clamps and the temporary fasteners in maintaining the pressure at the interface between the wing skin and the spar chords to prevent chips and burrs from intruding into that interface. The press-up force also assists in squeezing out any excess sealant resulting in very little sealant on the chips, so they may be vacuumed away without fouling the chip vacuum system with sealant. Temporary fasteners may be installed in the holes that require coldworking until the sealant cures, after which the holes may be coldworked and reamed, and the permanent fasteners installed.

The upper wing panel 30 is fastened to the shear tied ribs 38' as shown in FIG. 14 by drilling fastener holes from above the wing skin with the machine tool 40, using the digital product definition to inform the machine tool controller of the location of the shear tie pads 248 under the upper wing skin. Because of the flexibility of the ribs, it may be desirable for a mechanic to back drill pilot holes through predrilled pilot holes in selected shear tie pads 248 and install index head tack fasteners to fix the position of the intermediate portions of the shear tie ribs 38' against flexing in the spanwise direction. The machine tool 40 can then probe for the index heads of the tack fasteners and normalize the machine tool program with the actual position of the shear tied ribs 38' based on the position of the index heads. The machine tool 40 drills and countersinks full sized fastener holes from above the upper wing skin while a mechanic inside the wing box runs a chip chaser between the shear tie pads 248 and the inside surface of the wing skin. The machine tool 40 inserts the fastener while the mechanic inside the wing box places the nuts or collars and tightens the bolts with the appropriate power tool.

Aileron hinge ribs 130 are attached to the rear spar 34 for supporting an aileron hinge rod in bushings spaced to the rear of the rear spar. It is important for the smooth and trouble free operation of the aileron that the bushings in the ends of the aileron hinge ribs be aligned accurately on a single axis parallel to the rear spar. Because of the length of the aileron hinge ribs 130, a small discrepancy in its placement is magnified to a large deviation from the intended position of the hinge bushing at the end of the hinge rib. It was found that, even when the aileron hinge ribs were attached with the best possible accuracy while the spar 34 was being built up, the small distortion that was produced during final wing box assembly was sufficient to create unacceptable displacements of the ends of the hinge ribs so that they were no longer axially aligned. Therefore, in the practice of this invention, the attachment of the hinge ribs is scheduled for an assembly stage after the majority of the distorting events are finished.

Another factor influencing the positional accuracy of the hinge bushing on the installed hinge rib 130 is the effect that minute variations of positioning of the proximal end, or attaching end, of the aileron hinge rib 130 have on the position of the hinge bushing. Even when coordination holes are drilled very accurately in the spar web and in the proximal end of the aileron hinge rib, very small local variations in the flatness of the facing surfaces, variations in the perpendicularly of the hinge rib to its distal end mounting plate, and other small such variations can have a significant effect on the position in space of the hinge bushing after the rib is attached to the rear spar.

Figure 18:
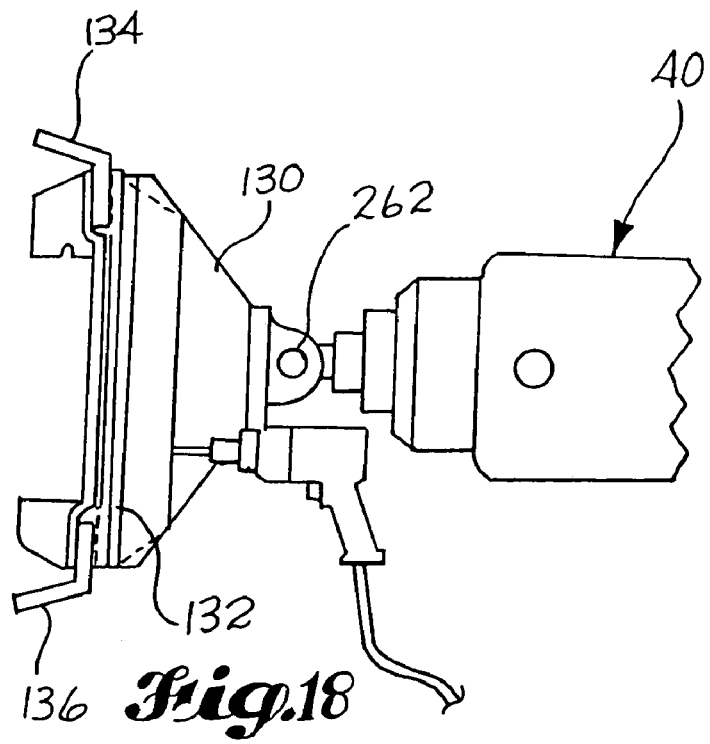
FIG. 18 is a schematic elevation of a process for mounting aileron hinge ribs to the rear spar.

To avoid all these problems in accordance with this invention, the hinge bushing in the end of the hinge rib 130 is set at its critical position in space, and the hinge rib is attached to the spar where it contacts the spar web. This simply avoids the difficulties of trying to control all the factors that influence the position of the hinge bushing in space. The controller 78 of the machine tool 40 directs the machine tool 40 to position a mounting pin 262, held by the machine tool 40 as shown in FIG. 18, in space at the position to the rear of the rear spar specified by the digital product definition as the location of the hinge bushing. The hinge bushing in the distal end of one of the hinge ribs is slipped onto the mounting pin 262, locating it accurately in spaced at its position specified by the digital product definition, and the proximal end of the hinge rib is attached to the spar web at the position determined by the position in space of the hinge bushing.

The side-of-body web 106 is positioned on the vertical flange 120 of the double-plus chord 116 and the vertical flange 104 of T-chord 100, and on the two sideways flanges on the spar terminal end fitting 207 using coordination holes predrilled into the side-of-body web 106 and the four flanges, as shown in FIGS. 8 and 8A. Temporary fasteners are installed to hold the side-of-body web 106 in place while full size fastener holes are drilled through the web and the four flanges. The web 106 is removed and the holes deburred, and the faying surface of the web is coated with sealant. The coated web is replaced on the flanges and fasteners are inserted through the holes. A mechanic inside the wingbox installs nuts or collars on the fasteners and tightens them with the appropriate power tool.

Figure 19:
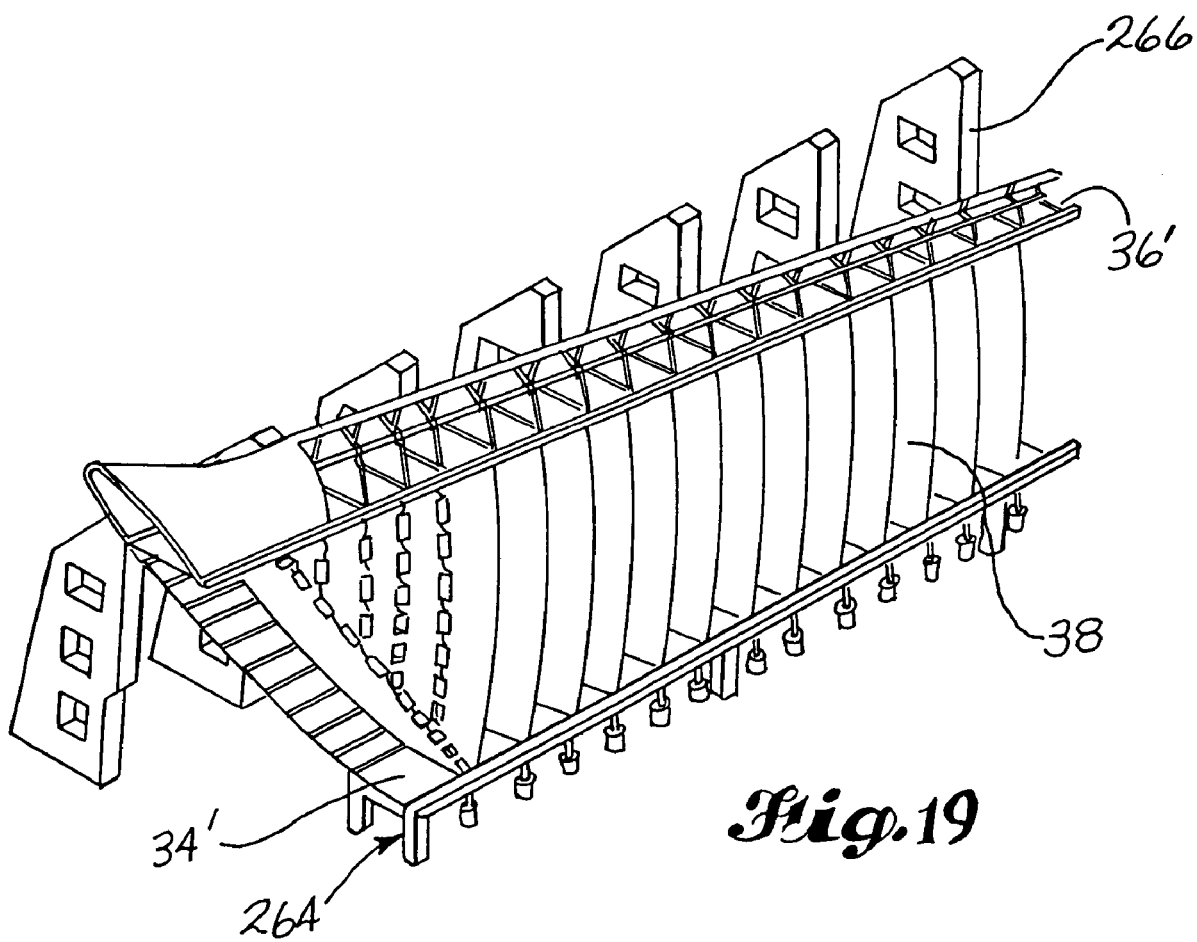
FIG. 19 is a schematic illustration of a spar-based wing assembly process in accordance with this invention with the wing waterline oriented in the vertical position during assembly.

The determinant assembly process is not limited to assembly of the major components in the horizontal or lying down position, illustrated in FIG. 3, with the waterline of the wing lying horizontally. Another assembly orientation is the spar-based vertical or "on-edge" orientation, with the waterline of the wing oriented vertically as shown in FIG. 19, using the rear spar as the base member on which the assembly is built. The rear spar is supported on a spar support structure 264 with the spar web in the horizontal position. This embodiment uses the rear spar 34' as the base sub-assembly to which the ribs and wing skins are attached. The spar support structure 264 holds the rear spar accurately to its theoretical shape while the assembly process proceeds. Ribs 38 are located to the rear spar 34' by aligning coordination holes in the ribs that are common to the rib posts 204. Temporary supports are attached to stabilize the ribs 38 until they are attached to the front spar 36'. A series of holding fixtures 266 is provided to hold the front spar 36' at the theoretical waterline position relative to the rear spar 34'. The holding fixtures 266 permit adjustment of the front spar 36' up and down since the distance between the rib coordination holes determines the chordwise distance between the front and rear spars, just is it does for the embodiment of FIG. 1. After all the fasteners are installed to secure the ribs to the spars, the temporary rib supports are removed.

The upper wing panel is positioned against the inner wing structure and accurately positioned in place by inserting alignment pins through a coordination hole in the inboard end of the wing panel. This coordination hole is common to the inboard end of the rear spar 34'. Outboard and intermediate secondary index holes in the rear spar provide additional location but are allowed to have some misalignment in the span-wise direction, for example, by using differential undersized holes or a slot in one part. Wing panel fixturing is designed to support the weight of the wing panel since the alignment pins through the coordination holes would not normally be designed to support a load of that magnitude. Since the panel fixture is not the sole authority for wing panel location, it is provided with adjustment mechanisms such as independent jacks and the like to facilitate alignment of the coordination holes in the wing panel and the spars.

After the wing panel is strapped or pulled against the ribs and front spar, full-sized fastener holes are match drilled in the wing skin, the spar and the ribs. The shape of the wing is determined by the shape and placement of the ribs. The wing skin is allowed to conform to the ribs by starting from the rear spar and wrapping the wing skin around the ribs by progressively installing fasteners until the wing skin meets the front spar. No coordination holes common to the front spar and the leading edge of the wing skin are needed, and the wing design allows a small payoff between the fixed leading edge and the wing skin.

After the fastener holes are drilled, the wing panel is separated from the ribs and spars and is deburred, cleaned, fay sealed and relocated against the ribs and spars. Fasteners are installed and tightened as described earlier. A numerically controlled track drill, machine tool or the like is used to drill holes in the skin common to the spar, thereby eliminating the use of drill templates now in common use in conventional wing manufacturing facilities. The lower skin is located and indexed to the rear spar just as the upper skin was. Nacelle, landing gear, flap tracks and other major fittings are located using light weight tools that pin to localized key coordination holes in the skin.

Figure 20:
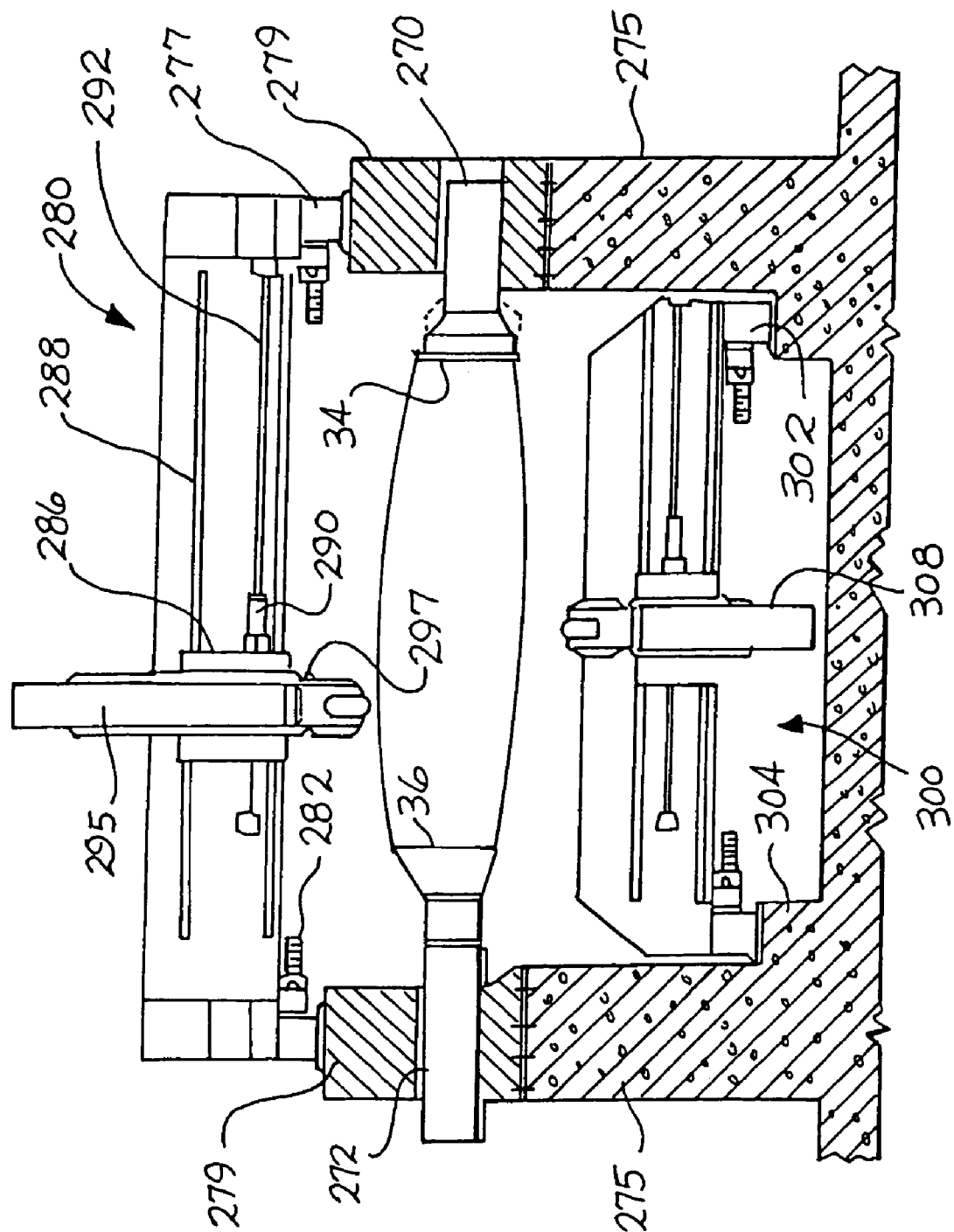
FIG. 20 is a sectional end elevation of an apparatus for assembling wings using a spar-based horizontal assembly process.

A spar based horizontal assembly technique is illustrated in FIG. 20. This technique allows access to both top and bottom sides of the wing and potentially could permit simultaneous operations on both sides for faster throughput and higher production rates.

The front and rear spars 34 and 36 are mounted on and supported by spar supports 270 and 272 carried by fixed upright columns 275. The spar supports 270 and 272 slide laterally in guides or linear bearings in the columns 275 to accommodate different sizes of wing for different model airplanes. The lateral freedom of movement also allows the spars to self-adjust to the lateral spacing between spars determined by the coordination holes drilled in the ends of the in-spar ribs.

Two laterally spaced rails 277 are mounted on rigid longitudinal beams 279 supported atop the columns 275. An upper gantry 280 is mounted for longitudinal traversing movement on the rails 277 under control of the controller 78 by traversing motors 282. A laterally traversing plate 286 mounted on rails 288 fastened to the gantry 280 is driven by engagement of a ball nut 290 with a ball screw. The ball screw 292 is driven by a servomotor mounted behind the plate 286 under control of the controller 78. A vertical arm 295 mounted on linear bearings and driven by a drive motor has a wrist 297 that can tilt to a desired angle and can rotate about the vertical axis of the arm 295. The wrist has a gripper that accepts a mechanical and power connection for an end effector so the arm 295 can position an end effector at the desired locations for drilling, hole measuring and conditioning, and fastener insertion.

A lower gantry 300 is mounted for longitudinal movement on rails 302 mounted on a shoulder 304 adjacent the inside edges of the columns 275. The gantry 300 has an arm 308 which is mounted like the arm 295, except the operating end is at the top end instead of the bottom end as for the arm 295 of the gantry 280. Otherwise, the gantries 280 and 300 are basically the same.

In operation, the spars 34 and 36 are loaded onto the spar supports 272 and the ribs are indexed to the rib posts on the spar and fastened thereto by temporary fasteners through the coordination holes. The upper and lower gantries are used to drill the fastener holes, and the ribs are removed, deburred and sealant is applied to the faying surfaces common to the rib posts. The ribs are repositioned and the end effector on the gantries 280 and 300 inserts the fasteners which are secured by workers following behind the gantries.

After all the ribs are attached, the lower gantry 300 is moved to a parking position at one end of its longitudinal travel beyond the wing position, and a lower wing panel 32 is transported by crane to a gurney supported on the same rails 302, and moved into position beneath the spars 34 and 36 and the in-spar ribs 38 on the gurney. The lower wing panel 32 is elevated to the undersurface of the spars 34 and 36 and the in-spar ribs 38 with a series of vertically telescoping supports and is indexed to the spars by alignment of predrilled coordination holes in the panel 32 and the spars 34 and 36. The wing panel is temporarily secured in place with straps around each rib and the vertically telescoping supports are retracted, clearing the way for the lower gantry 300 to move in and begin drilling fastener holes for attaching the wing panel 32 to the spars and ribs. The upper gantry arm 295 can be positioned opposite to the arm 308 to provide a reaction clamping force to prevent the feed force on the drill in the end effector in the arm 308 from lifting the rib or spar chord flanges away from the wing panel 32 when the drill breaks through the wing panel, which could allow interlaminar burrs to intrude between the surfaces. It is thus possible to apply sealant when the wing panel 32 is first positioned since there is no need for the usual deburring step.

After the lower wing panel 32 is attached, the upper gantry 280 is moved to a parking position beyond the wing position and upper wing panel 30 is transported by overhead crane directly to its intended position on the spars and ribs. The upper wing panel 30 is indexed to its correct position by aligned coordination holes predrilled in the wing panel and drilled in the spars 34 and 36 by an end effector held by the gantry arm 295. Index pins in the aligned coordination holes lock the wing panel in the proper position, and the gantry arm 295 moves to the positions designated by the machine program 68 to drill fastener holes. Depending on the stiffness of the spar chord flanges and the rib chord flanges and the drilling parameters, such as feed force, it may be necessary to deburr the fastener holes by lifting the wing panel 30 high enough to open access to the underside of the wing panel 30 and the top side of the spar and rib chords for the deburring operation. Sealant is applied and the panel is repositioned and the fasteners are inserted and secured as explained above.

End trimming of the spars and wing panels can be performed with router cutters in end effectors held by the arms 295 and 308. Coordination holes for the other components mentioned above are drilled by the gantry end effectors for attachment after removal from the apparatus. The aileron hinge ribs can be attached using pins held at the correct point in space by the gantry end effectors.

It is contemplated that two support fixtures shown in FIG. 20 could be positioned end-to-end so that the gantry positioner/machine tools could be at one end working on assembling the wing while workers are at the other end removing an assembled wing and setting up the components for the next wing to be assembled.

A system is thus disclosed which is usable for assembling airplane wing subassemblies into a full airplane wing with a high degree of precision and repeatability. The determinant assembly concept embodied in this disclosure utilizes the spatial relationships between key features of detail parts and subassemblies, as defined in the digital design and represented by coordination holes and other coordination features put into the parts and subassemblies by a numerically controlled tool, using original part design data from the engineering authority, to control the relative location of detail parts in subassemblies and the relative relationship of subassemblies to each other, making the parts and subassemblies self locating. This concept eliminates the need for traditional hard tooling used for decades in the airframe industry and for the first time enables assembly of large, heavy, flexible and semi-flexible mechanical structures wherein the contour of the structure and the relative dimensions within the structure are determined by the parts themselves rather than the tooling.

Freed in this way from dependence on fixed tooling, the wing can now be built to accommodate distortion created by manufacturing processes, such as interference fasteners and cold working, so that attachment of critical features on the wing at precisely accurate positions specified by the engineering design can be scheduled in the manufacturing process after distortion by the upstream processes which would have affected their position or orientation on the wing. The factory can now manufacture wings of any shape and size for which engineering data is provided, within the physical range of the CNC machine tools, and do so faster and with far greater precision than was possible with fixed tooling. The cost of building and maintaining the conventional wing component and wing major tooling, and the factory floor space for such fixed tooling, no longer need be amortized and factored into the price of the airplane, and it is now possible to build wings customized to meet the particular requirements of particular customers.

Obviously, numerous modifications and variations of the system disclosed herein will occur to those skilled in the art in view of this disclosure. Therefore, it is expressly to be understood that these modifications and variations, and the equivalents thereof, will be considered to be within the spirit and scope of the invention as defined in the following claims, wherein we claim:

The invention claimed is:

1. A method of manufacturing a wing, comprising: positioning a wing panel on a fixture and holding said wing panel immobile on said fixture;

accurately placing critical coordination features in said wing panel and in two wing spars using a numerically controlled machine tool running on part programs incorporating digital wing product definition data from an engineering data authority, said critical coordination features being placed in said wing panel at locations having predetermined relationships with corresponding coordination features in said wing spars when said spars are accurately located in predetermined positions, spaced chord-wise from each other on said wing panel, specified by said digital wing product definition against said wing skin with said critical features in said spars and said wing skin positioned in said predetermined relation to each other;

probing reference surfaces on said wing panel after positioning said wing panel on said fixture with a coordinate measuring system to obtain accurate position data for said wing panel on said fixture;

normalizing said wing part program to coincide with said accurate position of said wing panel on said fixture;

positioning said wing spars relative to said wing panel with said coordination features on said wing panel in registry with said coordination features on said wing spars and said wing spars thereby accurately located in said predetermined positions relative to said wing panel, as specified by said digital wing product definition;

fastening said wing spars in fixed relation relative to said wing panel in said predetermined position.

2. A method of manufacturing a wing as defined in claim 1, further comprising:

placing rib-to-spar critical coordination features in a plurality of wing ribs and in said spars using numerically controlled machine tools running on programs incorporating digital wing product definition from an engineering data authority, said ribs being accurately located in a predetermined position specified by said digital wing product definition relative to said wing spars when said rib-to-spar Critical features in said ribs and said wing spars are positioned In a predetermined relation to each other and fastening said wing ribs to said wing spars in said predetermined position.

3. A method of manufacturing a wing as defined in claim 2, further comprising:

drilling a plurality of stringer-to-chord coordination holes in lower wing skin stringers attached to a lower wing skin and in a lower spar chord using a numerically controlled machine tool running on a program incorporating said digital wing product definition data from said engineering data authority, said lower wing skin being accurately located in a predetermined position specified by said digital wing product definition relative to said wing spars when said stringer-to-chord critical features in said ribs and said wing spars are positioned in a predetermined relation to each other; and fastening said wing stringers and said wing spars together in said predetermined position.

4. A method of manufacturing a wing as defined in claim 1, wherein:

one spar is located on said wing panel at one point using a coordination hole common to said one spar and said wing panel and is located angularly on said wing panel using another reference coordination fixture;

another spar is located on said wing panel by registry of another coordination hole common to said other spar and said wing panel, and is located angularly on said wing panel using a rib fastened between said spars to determine the spacing between said spars at a position along said spars remote from said coordination holes.

5. A method of manufacturing a wing as defined in claim 1, further comprising:

placing rib-to-spar critical coordination features in a plurality of in-spar ribs and in said spars using numerically controlled machine tools running on programs incorporating digital wing product definition from an engineering data authority, said ribs being accurately located in a predetermined position specified by said digital wing product definition relative to said wing spars when said rib-to-spar critical features in said ribs and said wing spars are positioned in a predetermined relation to each other.

6. A method of assembling a wing in accordance with a digital engineering product definition of said wing and within tolerances specified In said definition, comprising:

machining coordination features in major wing components, including a wing spar, a plurality of wing ribs, and a wing skin, using a numerically controlled machine tool running on a wing part program incorporating said digital wing product definition from an ultimate engineering data authority, said coordination features being accurately located in predetermined positions on said components specified by said digital wing product definition such that said components are positioned at positions specified by said digital wing product definition relative to each other when corresponding ones of said coordination features are aligned with each other:

supporting a first wing skin in a horizontal orientation on a contoured fixture; and locating the other of said components relative to said first wing skin in a configuration determined by said coordination features to produce a wing in accordance with said digital engineering product definition of said wing and within tolerances specified in said definition.

7. A method of assembling a wing as defined in claim 6, further comprising:

checking the accuracy of said machine tool by probing a monument of known dimensions and location with a probe carried by said machine tool to compare the predicted dimensions and location of said monument with the dimensions and location as actually measured by said machine tool.

8. A method of assembling a wing in accordance with a digital engineering product definition of said wing and within tolerances specified in said definition, comprising:

machining coordination features in major wing components, including a wing spar, a plurality of wing ribs, and a wing skin, using a numerically controlled machine tool running on a wing part program incorporating said digital wing product definition from an ultimate engineering data authority, said coordination features being accurately located in predetermined positions on said components specified by said digital wing product definition such that said components are positioned at positions specified by said digital wing product definition relative to each other when corresponding ones of said coordination features are aligned with each other;

supporting a first wing skin in a horizontal orientation on a contoured fixture;

locating the other of said components relative to said first wing skin in a configuration determined by said coordination features to produce a wing in accordance with said digital engineering product definition of said wing and within tolerances specified in said definition;

probing reference surfaces on said wing panel after positioning said wing skin on said fixture with a coordinate measuring system to obtain accurate position data for said wing panel on said fixture; and normalizing said wing part program to coincide with said accurate position of said wing panel on said fixture.

9. A method of assembling a wing as defined in claim 8, wherein:

said reference features include said coordination features in said wing skin.

* * * * *